United States Patent
Grimaldi et al.

(10) Patent No.: US 12,086,157 B2
(45) Date of Patent: Sep. 10, 2024

(54) ASYNCHRONOUS STORAGE MANAGEMENT IN A DISTRIBUTED SYSTEM

(71) Applicant: HITACHI VANTARA LLC, Santa Clara, CA (US)

(72) Inventors: Kevin Canuette Grimaldi, Austin, TX (US); Marty Kulma, Longmont, CO (US); Andrew Todd, Cambridge, MA (US); Walter Wohler, Auburn, MA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 189 days.

(21) Appl. No.: 17/420,151

(22) PCT Filed: Mar. 4, 2019

(86) PCT No.: PCT/US2019/020500
§ 371 (c)(1),
(2) Date: Jul. 1, 2021

(87) PCT Pub. No.: WO2020/180290
PCT Pub. Date: Sep. 10, 2020

(65) Prior Publication Data
US 2022/0092083 A1 Mar. 24, 2022

(51) Int. Cl.
*G06F 16/23* (2019.01)
*G06F 11/14* (2006.01)
*G06F 16/27* (2019.01)

(52) U.S. Cl.
CPC ........ *G06F 16/273* (2019.01); *G06F 11/1471* (2013.01); *G06F 16/2365* (2019.01)

(58) Field of Classification Search
CPC . G06F 16/273; G06F 16/2365; G06F 11/1471
See application file for complete search history.

(56) References Cited

U.S. PATENT DOCUMENTS 5,970,488 A * 10/1999 Crowe ................. G06F 16/27
707/999.01
5,995,980 A * 11/1999 Olson ................ G06F 16/273
(Continued)

FOREIGN PATENT DOCUMENTS

CN 106716335 A * 5/2017 .......... G06F 3/0604
JP 2011-210106 A 10/2011
(Continued)

OTHER PUBLICATIONS

S. Guo, R. Dhamankar and L. Stewart, "DistributedLog: A High Performance Replicated Log Service," 2017 IEEE 33rd International Conference on Data Engineering (ICDE), San Diego, CA, USA, 2017, pp. 1183-1194, doi: 10.1109/ICDE.2017.163. (Year: 2017).*

(Continued)

*Primary Examiner* — Dennis Truong
(74) *Attorney, Agent, or Firm* — MATTINGLY & MALUR, PC

(57) ABSTRACT

In some examples, a system may receive, from a user device, a user request for a storage operation related to storage of data at a storage. An update may be added to an update queue to persist the storage operation prior to sending a response to the user device indicating performance of the storage operation. For instance, adding the update to the update queue may include sending a request to cause the update to be added to the update queue based on specifying a type of the storage operation and/or a state to be achieved by the storage operation. Additionally, information about the update may be sent to another processor for adding the update to another update queue managed by the other processor. Subsequently, the update may be obtained from the update queue and processed to perform the storage operation.

16 Claims, 19 Drawing Sheets

(56) References Cited

U.S. PATENT DOCUMENTS

| | | | |
|---|---|---|---|
| 8,843,441 B1* | 9/2014 | Rath | G06F 16/273 |
| | | | 707/614 |
| 8,965,861 B1 | 2/2015 | Shalla et al. | |
| 9,778,955 B2* | 10/2017 | Petit | G06Q 50/22 |
| 9,836,366 B2 | 12/2017 | Schatz et al. | |
| 9,904,721 B1* | 2/2018 | Holenstein | G06F 16/27 |
| 2005/0021567 A1* | 1/2005 | Holenstein | G06F 16/273 |
| 2005/0071708 A1* | 3/2005 | Bartfai | G06F 11/2064 |
| | | | 714/E11.102 |
| 2005/0289505 A1* | 12/2005 | Williams | G06F 9/4881 |
| | | | 717/103 |
| 2007/0113053 A1* | 5/2007 | Jensen | G06F 9/4881 |
| | | | 712/214 |
| 2009/0030986 A1* | 1/2009 | Bates | G06F 11/2074 |
| | | | 709/205 |
| 2009/0177666 A1* | 7/2009 | Kaneda | G06F 16/10 |
| 2009/0177710 A1* | 7/2009 | Holenstein | G06F 16/273 |
| 2010/0325190 A1* | 12/2010 | Riley | G06F 11/2097 |
| | | | 709/251 |
| 2011/0196899 A1 | 8/2011 | Hughes et al. | |
| 2012/0023066 A1* | 1/2012 | Bourbonnais | G06F 16/256 |
| | | | 707/613 |
| 2012/0215741 A1* | 8/2012 | Poole | H04L 67/1095 |
| | | | 707/634 |
| 2013/0054532 A1* | 2/2013 | Schreter | G06F 16/221 |
| | | | 707/E17.005 |
| 2014/0372696 A1* | 12/2014 | Tune | G06F 12/0846 |
| | | | 711/114 |
| 2015/0089156 A1* | 3/2015 | Clohset | G06T 15/06 |
| | | | 711/141 |
| 2015/0178135 A1 | 6/2015 | Wang | |
| 2016/0188360 A1* | 6/2016 | Allen | G06F 9/5027 |
| | | | 718/1 |
| 2016/0342335 A1* | 11/2016 | Dey | G06F 3/0619 |
| 2017/0011544 A1* | 1/2017 | Clohset | G06T 15/005 |
| 2017/0351697 A1* | 12/2017 | Brosch | H03M 7/3091 |
| 2017/0364273 A1* | 12/2017 | Schreter | G06F 16/27 |
| 2019/0303386 A1* | 10/2019 | Halligan | H04W 8/20 |
| 2020/0259898 A1* | 8/2020 | Dhuse | G06F 3/0656 |

FOREIGN PATENT DOCUMENTS

| | | | | |
|---|---|---|---|---|
| JP | 2015-60486 A | | 3/2015 | |
| WO | WO-2015023607 A1 | * | 2/2015 | G06F 12/023 |

OTHER PUBLICATIONS

Pen-Nan Lee, L. Miller, Ping-Chuan Tai and Yiwei Chen, "Object oriented design for a distributed priority queue," Proceedings Nineteenth Annual International Computer Software and Applications Conference (COMPSAC'95), Dallas, TX, USA, 1995, pp. 192-198, doi: 10.1109/CMPSAC.1995.524779. (Year: 1995).*

Japanese Office Action received in corresponding Japanese Application No. 2021-549453 dated Sep. 13, 2022.

Extended European Search Report received in corresponding European Application No. 19918036.5 dated Sep. 16, 2022.

Anonymous, "Priority queue—Wikipedia", Feb. 28, 2019, pp. 1-7, URL: https://web.archive.org/web/20190228003505/https://en.wikipedia.org/wiki/Priority_queue.

Akira, K., "The Performance Analysis of the Distributed Database based on Others and Raft", Information Processing Society of Japan SIG Technical Report, May 9, 2017, pp. 1-9, vol. 2017-OS-140, No. 15.

International Search Report and Written Opinion of the International Searching Authority of PCT/US2019/020500 dated May 10, 2019.

Japanese Office Action received in corresponding Japanese Application No. 2021-549453 dated Feb. 28, 2023.

Chinese Office Action received in corresponding Chinese Application No. 201980093510.9 dated Jan. 4, 2024.

* cited by examiner

ASYNCHRONOUS STORAGE MANAGEMENT IN A DISTRIBUTED SYSTEM

TECHNICAL FIELD

This disclosure relates to the technical field of data storage.

BACKGROUND

Data objects may be stored in an object storage architecture that manages data as objects. Many actions for management of stored data may be computationally expensive and, when performed in line, may introduce response times that are longer than desirable for some applications. Conventional solutions for performing certain storage management actions asynchronously may be limited in their ability to guarantee correctness of each operation. For instance, conventional solutions may have insufficient atomicity of guarantees that some operations may require. Additionally, some actions may be asynchronous by nature, such as the expiration of an object's retention after a period of time. Accordingly, efficient and reliable protection mechanisms are desirable for enabling high performance of complex data management systems.

SUMMARY

Some implementations herein include a durable update queue. For example, a system may receive, from a user device, a user request for a storage operation related to storage of data at a storage. An update may be added to an update queue to persist the storage operation prior to sending a response to the user device indicating performance of the storage operation. For instance, adding the update to the update queue may include sending a request to cause the update to be added to the update queue based at least on specifying a type of the storage operation and/or a state to be achieved by the storage operation. Additionally, information about the update may be sent to another processor for adding the update to another update queue managed by the other processor. Subsequently, the update may be obtained from the update queue and processed to perform the storage operation.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION OF THE EMBODIMENTS

Figure 1:
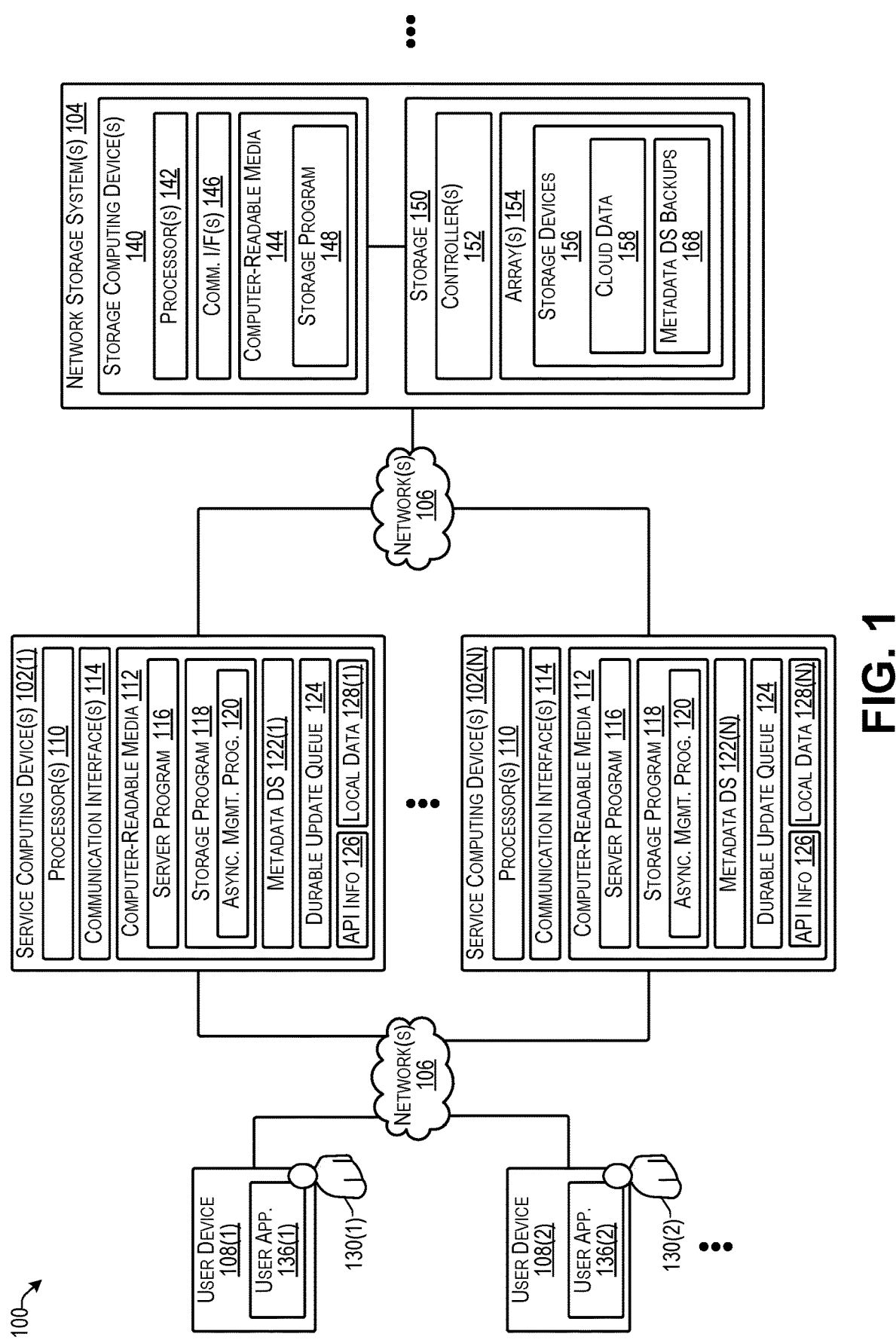
FIG. 1 illustrates an example architecture of a system able to store data according to some implementations.

Some implementations herein are directed to techniques and arrangements for a distributed computer system including a highly available durable update queue (DUQ) that maintains user requests and other storage updates. For example, an asynchronous management program may be executed as a background service that manages the DUQ to ensure that storage management activities are performed and completed in the correct order and as directed. In some cases, an update to the DUQ may be performed in the same transaction as the performance of a user request or other storage event, making the DUQ highly efficient and consistent. Redundancy of the DUQ may be achieved through a Raft consensus algorithm or other suitable consensus algorithm. Further, as one example, the DUQ may be stored using a log-structured merge tree (LSM tree) data structure.

In some examples, to support both efficiency and safety, the highly available DUQ herein may be persisted with redundancy for storing updates that are to be processed asynchronously. Because there may be at least three copies of the DUQ, the computer system is able to withstand failure of a storage device on which the DUQ is stored. The DUQ may hold information about any general purpose update and may be employed for any type of generic policy or action. The updates to the DUQ may be made within the same transaction as other state changes. This ensures that the update is persisted to the DUQ before responding back to a user. Additionally, the update may still require further processing within the computer system following the response to the user.

In some cases, a transaction that changes an index may also cause an update to be committed to another index. Accordingly, the update to the other index may also be added to the DUQ. As one example, if there is already an update for the other index that was previously added to the DUQ, and that update has not yet been processed, then the DUQ may collapse the multiple updates into a single update. These multiple updates, if they include a state, may also individually control how to merge two updates so that the states are consistent. Consequently, implementations herein include a flexible system for storing arbitrary updates for later processing. Consistency may be maintained by adding updates to the DUQ in the same transaction as the rest of the changes to the system, to reduce or eliminate the chance of an update being lost or, conversely, of the changes being lost while the update is recorded in the DUQ.

In some examples, an asynchronous management program may periodically poll the DUQ for updates to be processed. The asynchronous management program may process these updates by marking the update in the DUQ to be processed as "in-progress", and may internally add the update to an in-memory queue for a worker to then process. This worker may make whatever changes are associated with the update, such as updating a secondary index, sending a message to a system, or the like. After the update has been processed, the update may be dequeued from the DUQ so that the DUQ does not grow in size forever.

As one example, suppose that a portion of the computer system is deployed in an environment including a first user, and that the first user is using a user application to ingest a set of videos that will be retained in the system for a few months. Further, suppose that subsequently, a portion of those videos selected based on a specific criteria need to have a specific metadata tag applied to them and then be migrated to a remote site for archiving. Thus, this example describes a chain of operations applied in a specific way. Further, while the chain of operations in this example is fairly complex, substantially more complex chains of operations often may be applied in real-world implementations of the system herein.

In the example set forth above, there are multiple storage-related operations of an expensive nature that are performed by the system through the entire life cycle of the data to complete the above chain of operations. In order to accomplish the example chain of operations, an update to set retention for the videos at the time of ingest of each of the videos may be inserted into the DUQ. Similarly, an update to initiate an indexing job based on the criteria above may also be inserted into the DUQ. The result of indexing may then be used to query the set of objects to be associated with the metadata tag. At the time of application of the metadata tag, another update may be inserted into the DUQ to setup an action to migrate the tagged objects to the remote site for archiving.

An example advantage of the DUQ herein is that the chain of updates inserted into the DUQ may be triggered based on the outcome of a previously applied action. As another example, suppose that after an update to migrate the data is added to the DUQ, a node in the system on which one copy of the DUQ exists goes down or otherwise becomes unavailable. Because, the DUQ may be maintained redundantly on multiple nodes in the system, the processing for the above examples may still be performed as instructed using a redundant copy of the DUQ maintained on another node in the system.

Accordingly, implementations herein enable asynchronous updates within a distributed computing system through the use of a persistent DUQ. The updates added to the DUQ herein are atomic with the rest of the state change for guaranteeing correctness. The techniques herein eliminate the question of whether an update will be present with the corresponding changes made synchronously with the user request. The updates may not be queued before a synchronous change so there is no risk of an update in the DUQ persisting forever because the DUQ cannot be run without the corresponding state added synchronously. Additionally, the update will not have been queued after the synchronous update so there is no risk of a synchronous change without a needed update. The updates may safely be consumed as soon as they are retrieved from the DUQ, and if the corresponding state change has been applied, there is no risk of the update not being in the DUQ.

For discussion purposes, some example implementations are described in the environment of a plurality of service computing devices in communication with a cloud storage system for managing storage of objects and/or other data and associated metadata. However, implementations herein are not limited to the particular examples provided, and may be extended to other types of computing system architectures, other types of storage environments, other types of user configurations, other types of data, and so forth, as will be apparent to those of skill in the art in light of the disclosure herein.

FIG. 1 illustrates an example architecture of a system 100 able to store data according to some implementations. The system 100 includes a plurality of service computing devices 102(1)-102(N) that are able to communicate with, or otherwise coupled to, at least one storage system(s) 104, such as through one or more networks 106. Further, the service computing devices 102 are able to communicate over the network(s) 106 with one or more user computing devices 108, such as user devices 108(1), 108(2), . . . , which may be any of various types of computing devices, as discussed additionally below.

In some examples, the service computing devices 102 may include one or more servers that may be embodied in any number of ways. For instance, the programs, other functional components, and at least a portion of data storage of the service computing devices 102 may be implemented on at least one server, such as in a cluster of servers, a server farm, a data center, a cloud-hosted computing service, and so forth, although other computer architectures may additionally or alternatively be used. In the illustrated example, the service computing devices 102 include, or may have associated therewith, one or more processors 110, one or more computer-readable media 112, and one or more communication interfaces 114.

Each processor 110 may be a single processing unit or a number of processing units, and may include single or multiple computing units, or multiple processing cores. The processor(s) 110 can be implemented as one or more central processing units, microprocessors, microcomputers, microcontrollers, digital signal processors, state machines, logic circuitries, and/or any devices that manipulate signals based on operational instructions. As one example, the processor(s) 110 may include one or more hardware processors and/or logic circuits of any suitable type specifically programmed or configured to execute the algorithms and processes described herein. The processor(s) 110 may be configured to fetch and execute computer-readable instructions stored in the computer-readable media 112, which may program the processor(s) 110 to perform the functions described herein.

The computer-readable media 112 may include volatile and nonvolatile memory and/or removable and non-removable media implemented in any type of technology for storage of information, such as computer-readable instructions, data structures, program modules, or other data. For example, the computer-readable media 112 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 112 may be a tangible non-transitory medium to the extent that, when mentioned, non-transitory computer-readable media exclude media such as energy, carrier signals, electromagnetic waves, and/or signals per se. In some cases, the computer-readable media 112 may be at the same location as the service computing device 102, while in other examples, the computer-readable media 112 may be partially remote from the service computing device 102. For instance, in some cases, the computer-readable media 112 may include a portion of storage in the storage system(s) 104.

The computer-readable media 112 may be used to store any number of functional components that are executable by the processor(s) 110. In many implementations, these functional components comprise instructions or programs that are executable by the processor(s) 110 and that, when executed, specifically program the processor(s) 110 to perform the actions attributed herein to the service computing device 102. Functional components stored in the computer-readable media 112 may include a server program 116 and a storage program 118, each of which may include one or more computer programs, applications, executable code, or portions thereof. For example, the server program 116 may provide communication functionality with the user devices 108 and the storage system(s) 104.

The storage program 118 may include an asynchronous management program 120 and may further include a database management function for creating and managing a metadata data structure (DS) 122(1)-122(N) containing metadata related to data stored and managed by the service computing device(s) 102(1)-102(N). For example, the storage program 118 may include executable instructions configured to cause the storage program 118 to maintain file systems, object information, data management information, and other information as part of the metadata data structure 122(1)-122(N). The storage program 118 may further perform a management function for managing other types of information included in the metadata data structures 122(1)-122(N), such as user information.

The asynchronous management program 120 may manage and maintain a durable update queue (DUQ) 124. For example, the DUQ 124 may be used to manage updates to the data stored by the service computing device 102, as discussed additionally below. Additional functional components stored in the computer-readable media 112 may include an operating system (not shown in FIG. 1) for controlling and managing various functions of the service computing devices 102. In some cases, the functional components may be stored in a storage portion of the computer-readable media 112, loaded into a local memory portion of the computer-readable media 112, and executed by the one or more processors 110.

In addition, the computer-readable media 112 may store data, data structures, and other information used for performing the functions and services described herein. For example, the computer-readable media 112 may store the metadata data structures 122(1)-122(N) and the DUQ 124. In addition, the computer-readable media 112 may store application programming interface (API) information 126 that is used by the storage program 118 and/or the async management program 120 when performing some of the functions described herein, as discussed additionally below. Further, the computer-readable media 112 may store local data 128(1)-128(N), which may be data stored by each service computing device 102(1)-102(N), such as based on interaction with user devices 108 or the like.

The service computing device 102 may also include or maintain other functional components and data, which may include programs, drivers, etc., and the data used or generated by the functional components. Further, the service computing device 102 may include many other logical, programmatic, and physical components, of which those described above are merely examples that are related to the discussion herein.

The one or more communication interfaces (I/Fs) 114 may include one or more software and hardware components for enabling communication with various other devices, such as over the one or more network(s) 106. Thus, the communication interfaces 114 may include, or may couple to, one or more ports that provide connection to the network(s) 106 for communicating with the storage system(s) 104, the other service computing devices 102, and the user devices 108. For example, the communication interface(s) 114 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

The one or more networks 106 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing devices 102, the network storage system(s) 104 and the user devices 108 are able to communicate over the one or more networks 106 using wired or wireless connections, and combinations thereof.

Each user device 108 may be any suitable type of computing device such as a desktop, laptop, tablet computing device, mobile device, smart phone, wearable device, and/or any other type of computing device able to send data over a network. Users 130(1), 130(2), . . . , may be associated with user devices 108(1), 108(2), . . . , respectively, such as through a respective user account, user login credentials, or the like. Furthermore, the user devices 108 may be able to communicate with the service computing device(s) 102 through the one or more networks 106, through separate networks, or through any other suitable type of communication connection. Numerous other variations will be apparent to those of skill in the art having the benefit of the disclosure herein.

Further, each user device 108(1), 108(2), . . . , may include a respective instance of a user application 136(1), 136(2), . . . , that may execute on the respective user device 108(1), 108(2), . . . , such as for communicating with the server program 116, e.g., for sending user data for storage on the network storage system(s) 104 and/or for receiving stored data from the network storage system(s) 104. In some cases, the application 136 may include a browser or may operate through a browser, while in other cases, the application 136 may include any other type of application having communication functionality enabling communication with the server program 116 over the one or more networks 106.

The storage system(s) 104 may include one or more storage computing devices 140, which may include one or more servers or any other suitable computing device, such as any of the examples discussed above with respect to the service computing device 102. The storage computing device(s) 140 may each include one or more processors 142, one or more computer-readable media 144, and one or more communication interfaces 146. For example, the processors 142 may correspond to any of the examples discussed above with respect to the processors 110, the computer-readable media 144 may correspond to any of the examples discussed above with respect to the computer-readable media 112, and the communication interfaces 146 may correspond to any of the examples discussed above with respect to the communication interfaces 114.

In addition, the computer-readable media 144 may include a storage program 148 as a functional component executed by the one or more processors 142 for managing the storage of data on a storage 150 included in the storage system(s) 104. The storage 150 may include one or more controllers 152 associated with the storage 150 for storing data on one or more arrays 154 of storage devices 156, or the like. For instance, the controller 152 may control the arrays 154, such as for configuring the arrays 154 in a RAID configuration, JBOD configuration, or the like, and/or for presenting logical units based on the storage devices 156 to the storage program 148, and for managing data, such as data objects or other data, stored on the underlying physical storage devices 156 as cloud data 158. The storage devices 156 may be any type of storage device, such as hard disk drives, solid state drives, optical drives, magnetic tape, combinations thereof, and so forth. In some examples, the network storage system(s) 104 may include commercially available cloud storage as is known in the art, while in other examples, the network storage system(s) 104 may include private or enterprise storage systems accessible only by an entity associated with the service computing devices 102.

In the system 100, the users 130 may store data to, and receive data from, the service computing device(s) 102 that their respective user devices 108 are in communication with. Accordingly, the service computing devices 102 may provide local storage for the users 130 and respective user devices 108. During steady state operation there may be users 108 periodically communicating with the service computing devices 102. In addition, the service computing devices may periodically backup the metadata data structures 122 to the network storage system(s) 104 as metadata data structure backups 168 to enable recovery of the metadata data structure 122 if a service computing device 102 should suffer a failure.

In some cases, the service computing devices 102 may be arranged into one or more groups, clusters, systems or the like. For instance, in some examples (not shown in FIG. 1) the service computing devices 102 may be arranged in pairs in which a first service computing device 102 may be coupled to a second service computing device 102 so that together they form a computing node for providing storage and data management services to a plurality of the user devices 108. For instance, the first service computing device 102(1) may act as a primary computing device, while the second service computing device 102(2) may act as a secondary computing device, at least with respect to maintaining the metadata data structure 122. Additionally, or alternatively, in some examples, the service computing devices 102 may be arranged in a plurality of clusters at geographically separate and remote locations to enable replication and disaster recovery. Numerous other configurations will be apparent to those of skill in the art having the benefit of the disclosure herein.

As mentioned above, in some cases, a plurality of the service computing devices 102 may be configured in a Raft configuration for management of the DUQ 124 and for providing redundancy of the DUQ 124 at multiple locations. For example, the persistent DUQ 124 enables asynchronous updates to be performed within the distributed computing system 100. The updates added to the DUQ 124 may be atomic with the rest of the state change for guaranteeing correctness. The use of the DUQ 124 ensures that an update will be present with corresponding changes made synchronously with a user request. Further, the updates might not be queued before a synchronous change so there is no risk of an update in the DUQ persisting forever because the DUQ cannot be run without the corresponding state added synchronously. Additionally, an update might not be queued after the synchronous update so there is no risk of a synchronous change without an expected update. The updates may safely be consumed as soon as they are retrieved from the DUQ 124, and if the corresponding state change has been applied, there is no risk of the update not being in the DUQ. Additional features and applications of the DUQ 124 are discussed below.

Figure 2:
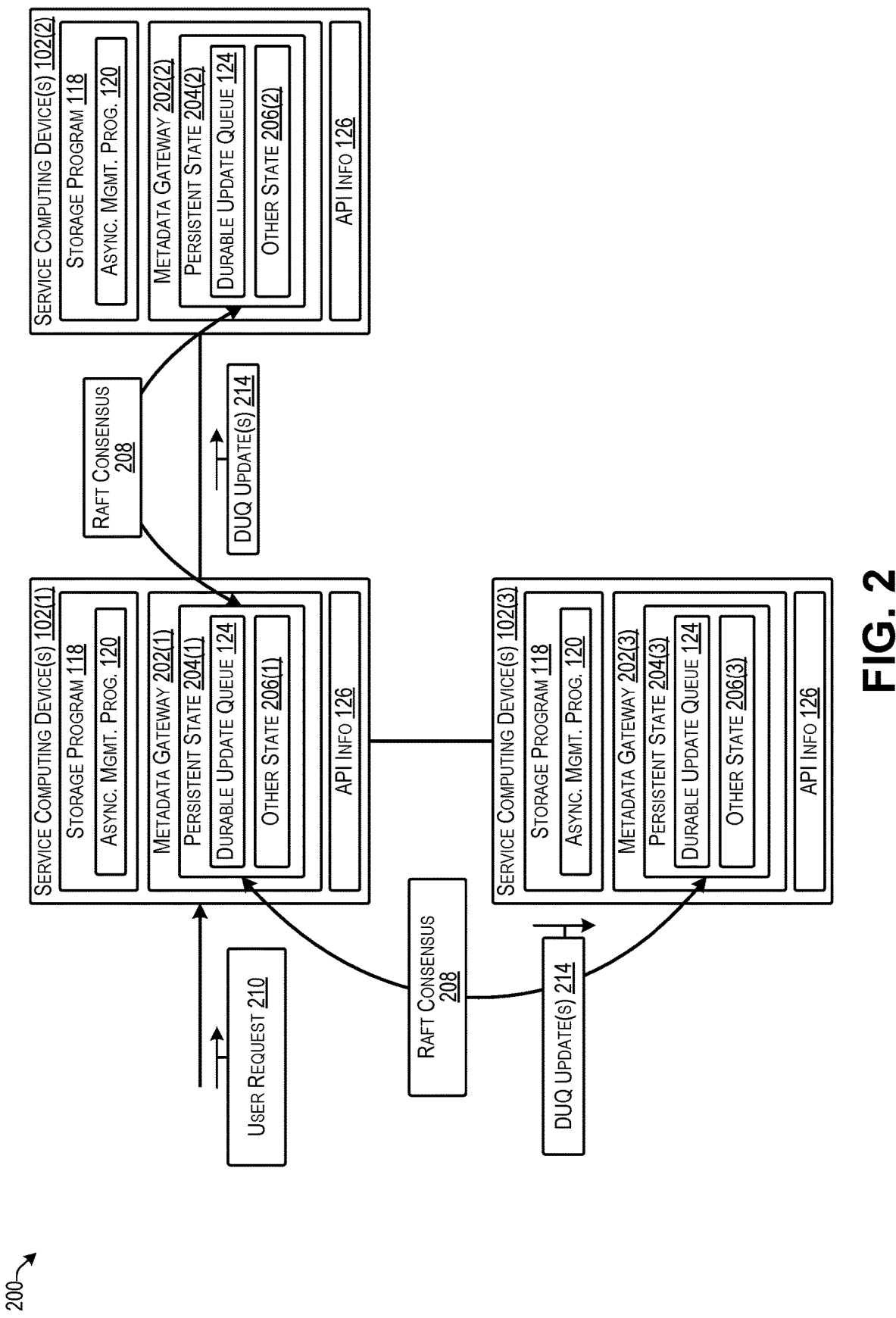
FIG. 2 is a block diagram illustrating an example configuration of a plurality of service computing devices according to some implementations.

FIG. 2 is a block diagram illustrating an example configuration 200 of a plurality of service computing devices 102 according to some implementations. The service computing devices 102(1)-102(3) may be configured to execute a Raft consensus algorithm for managing the DUQ 124 in some examples. For instance, the computing system may be arranged as a distributed object store that uses cloud storage or other network storage as the primary storage, and in some examples, may store objects in buckets that are created by the users (not shown in FIG. 2).

In the example of FIG. 2, the DUQ 124 may reside along with other state inside of a process generated by the async management program 120 referred to as a metadata gateway 202. Thus, each service computing device 102(1)-102(3) may include a respective metadata gateway 202(1)-202(3), each having a persistent state 204(1)-204(3) including the DUQ 124 and other state 206(1)-206(3). The metadata gateway 202 manages the metadata-related operations performed by the respective service computing device 102(1)-102(3). The metadata gateway 202 may provide or may otherwise access one or more APIs, such as from API information 126 that allows the service computing device 102 to make calls to perform specific higher level operations, such as creating a bucket. In some cases, performing these operations require interacting with more than one index (not shown in FIG. 2). As one example, the bucket creation operation may include interacting with three indexes. Accordingly, updating of the secondary indexes may include the use of the DUQ 124 to ensure that the updates are all executed correctly to provide consistent secondary indexes. In addition, the DUQ 124 may be used to perform scheduled policies, such as performing various maintenance tasks in the distributed system, such as automatically deleting objects that meet certain criteria, as well as managing user-defined actions, such as allowing users to define policies that may be executed on certain operations, conditions, or the like.

As mentioned above, in some cases, the service computing devices 102(1)-102(3) may be configured to operate as a Raft group to provide redundancy of the DUQ 124. For example, the async management program 120 may employ the Raft algorithm to maintain consistency of the persistent state 204, including the DUQ 124 and the other state 206 across multiple service computing devices 102. The Raft algorithm ensures that each service computing device 102 (1)-102(3) agrees upon the same series of state transitions. Accordingly, a raft consensus 208 may apply to the entire persistent state 204, not just the DUQ 124, as the DUQ 124 may be replicated using the raft consensus protocol along with the accompanying state (e.g., other state 206), and typically not independently of the other state 206. The Raft group achieves consensus via an elected leader, e.g., a service computing device 102 in a Raft group may be either the leader or a follower. The leader may be responsible for DUQ 124 replication to the followers. The leader may regularly inform the followers of its existence by sending a heartbeat message.

In this example, suppose that a user request 210 for storing an object according to an instructed policy is received, e.g., from a user device 108 discussed above with respect to FIG. 1. Further, suppose that the first service computing device 102(1) is a raft group leader and that the service computing devices 102(2) and 102(3) are raft group followers of the first service computing device 102(1). Accordingly, the user request 210 causes the storage program to store the object and write at least one update to the DUQ 124 as a single transaction at the first service computing device 102(1). In addition, the raft leader, service computing device 102(1), may propagate the at least one update to the DUQ 124 to the raft followers, service computing devices 102(2) and 102(3). Accordingly, as indicated at 208, through the raft consensus algorithm, the raft leader may send the at least one DUQ update 214 to the second service computing device 102(2) and the third service computing device 102(3). Additionally, as mentioned above, in some examples, information related to the other state 206 may also be updated through the raft consensus 208, the nature of which may depend at least in part on the updates being applied through the DUQ 124. Accordingly, redundant copies of the DUQ 124 may be periodically updated based on the Raft algorithm. Because multiple copies of the DUQ 124 are maintained on multiple different storage devices, the system is able to withstand failure of a storage device or computing device on which the DUQ 124 is maintained. Furthermore, by performing updates the DUQ 124 in the same transaction as the user request, the event is persisted before responding back to the user, the latency to the updating of the metadata data structure is reduced, and any subsequent updates processed from the DUQ 124 can be processed asynchronously. Further, should the processing of an existing update result in the requirement of additional processing to another data structure, object, or the like, the additional processing can be added to the DUQ 124 as an additional update, and may also be performed asynchronously.

The DUQ 124 may be a redundant priority queue stored as a log structured merge tree data structure, and kept in the same storage as the rest of the system's state. This enables the DUQ 124 to be updated atomically with the rest of the system's state. Each update to the DUQ 124 may include a plurality of attributes. A priority attribute may be an integer that indicates the priority of an item in the DUQ 124. For example, the priority may be the first consideration for what determines the order in which updates in the DUQ 124 are processed. Updates with a higher priority may be processed sooner than updates with a lower priority.

A queue number attribute may also be an integer that may be unique with the DUQ 124 for each update. For instance, as each update is inserted into the DUQ 124, the update may be assigned a number from a monotonically increasing counter. Updates with a higher queue number may be inserted into the DUQ 124 after updates with a lower queue number. Thus, the queue number may be the second consideration that determines the order in which updates are processed. Updates with a lower queue number may be processed sooner than updates with a higher queue number, if the two updates have the same priority.

Another attribute may be the type of update, which may be an enumerated type that determines how the update will be processed by the async management program, as well as how to collapse updates for the same key. The key attribute may be a blob that provides the DUQ 124 with a mechanism with which the DUQ 124 can deduplicate updates. In addition a processor identifier (ID) attribute may be a unique ID for the individual processors in the system that indicates which processor is currently processing a particular update. For updates that are not being processed, the processor ID attribute is not set. Furthermore, a state attribute may be a blob that contains anything relevant to the update that is not available in any of the other fields discussed above.

In addition, DUQ 124 may employ the following one or more APIs that may be included in API information 126. In some cases, all of these APIs may be atomic. An "enqueue" API may be is responsible for inserting updates into the DUQ 124. A "get work" API may be responsible for retrieving work from the DUQ 124. A "dequeue" API may be responsible for cleaning up completed updates from the DUQ 124. A "requeue" API may be responsible for putting incomplete work back into the DUQ 124 so that the DUQ 124 may be further processed, potentially by other processors. A list in progress API may be responsible for getting work that is already being processed by a processor. Examples of the functions of each of the above-mentioned APIs are provided below and illustrated in FIGS. 3-9.

Figure 3:
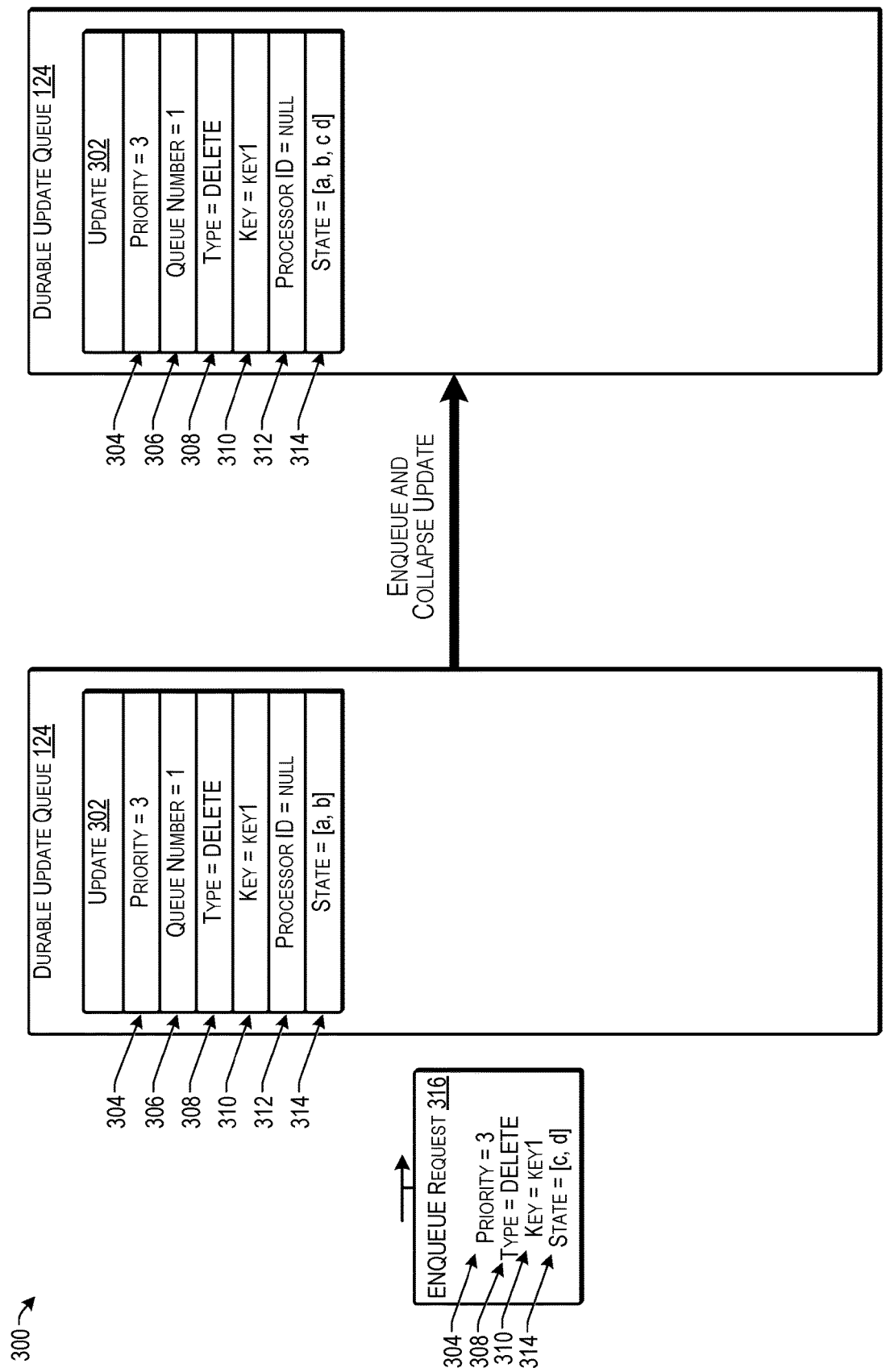
FIG. 3 is a block diagram illustrating an example of performing an enqueue and collapse update operation according to some implementations.

FIG. 3 is a block diagram illustrating an example of performing an enqueue and collapse update operation 300 according to some implementations. As mentioned above, the enqueue API may be responsible for inserting updates into the DUQ 124. The enqueue API may take a priority, type, key, and state as arguments. The enqueue API may determine whether a received update should be collapsed with an update that already exists in the DUQ 124. When an update does already exist in the DUQ 124 and is eligible for collapsing with the received update, then the updates will be collapsed to have the same priority and queue number as the update that was already in the DUQ 124. The type and key of the update will be unchanged. As updates are only eligible to be collapsed if they are not being processed, the processor ID of the update will be null. The state attribute's value may be determined by the type of the update, which receives the old state and new state as inputs, returning a state blob that is included in the update.

On the other hand, when an update does not already exist in the DUQ 124, or the existing update is not eligible for collapsing, then a new update may be added to the DUQ 124. An update will not be eligible for collapsing if an update for the key does not exist in the DUQ 124, if the update in the DUQ 124 for that key is already being processed, or if the type of update does not support collapsing.

In the example of FIG. 3, an update 302 already is present in the DUQ 124, and includes a priority 304 equal to 3, a queue number 306 equal to 1, a type 308 "DELETE", a key 310 of "key 1", a processor ID 312 equal to null, and a state 314 equal to [a, b]. Suppose that an enqueue request 316 is taking place. The enqueue request 316 is performed against the DUQ 124 on the left resulting a change of state of the DUQ 124 to the DUQ 124 as shown on the right after the enqueue request 316 is completed.

The enqueue request 316 includes a priority 304 of 3, a type 308 DELETE, a key 310 of key1, and state 314 equal to [c, d]. Thus, because the priority 304, the type 308, and the key 310 are the same for the existing update 302 and the enqueue request 316, the new update may be collapsed with the existing update 302, which results in a change in the state 314 of the existing update 302. Thus, the state 314 in the DUQ 124 following enqueue and collapse of the update is a combination of the state of the existing update 302 and the state of the enqueue request 316, i.e., [a, b, c, d]. This is because the state 314 was collapsed between the update 302 already in the DUQ 124 and the enqueue request 316, in this case to append the state from the enqueue request 316 to the state from the update 302 already in the DUQ 124. How the state is collapsed may depend on the individual update types.

Figure 4:
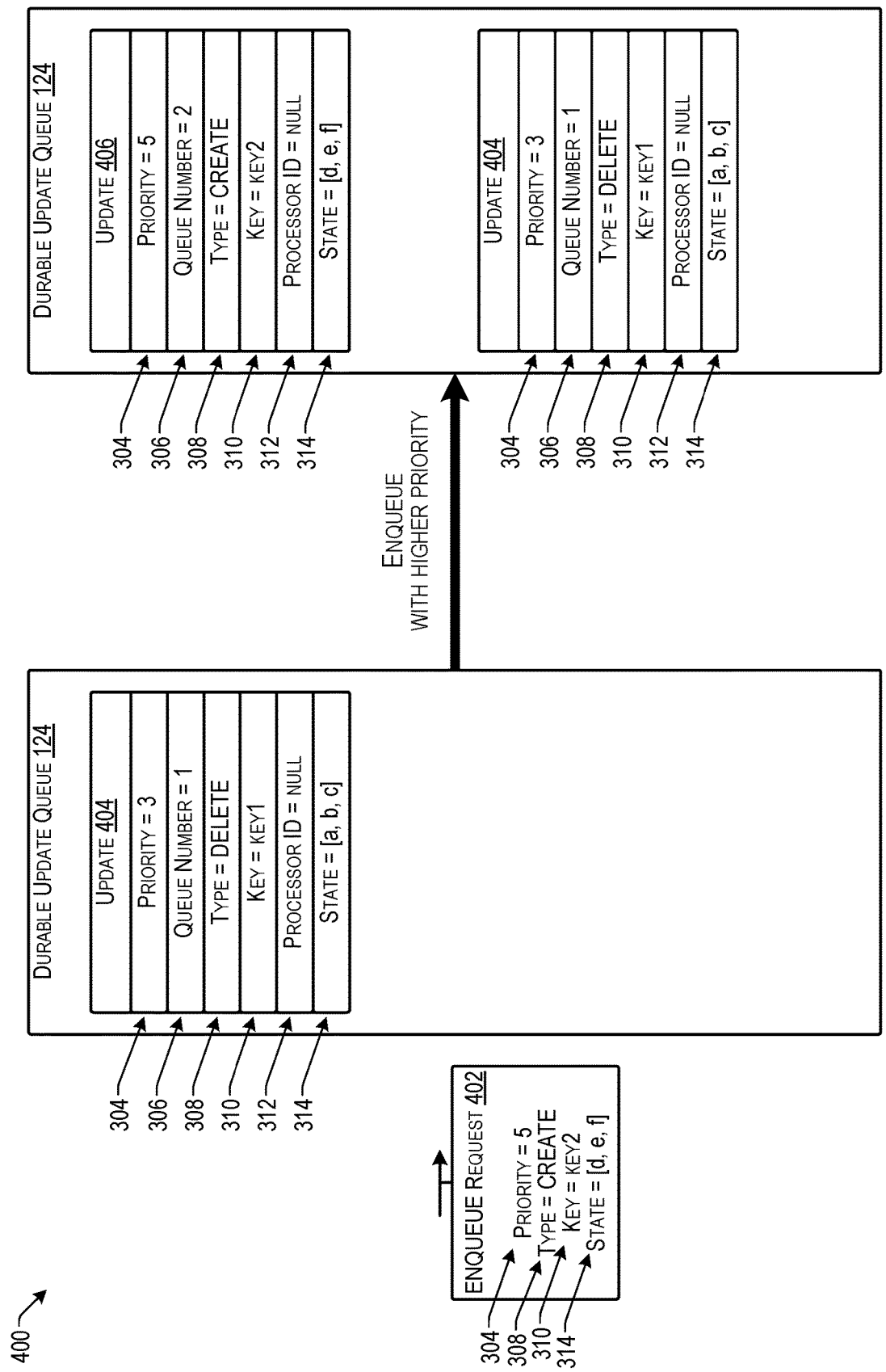
FIG. 4 is a block diagram illustrating an example of performing an enqueue with higher priority operation according to some implementations.

FIG. 4 is a block diagram illustrating an example of performing an enqueue with higher priority operation 400 according to some implementations. In this example, an enqueue request 402 is received. The enqueue request 402 includes a priority 304 of 5, a type 308 of CREATE, a key 310 equal to key2, and a state 314. When the enqueue request 402 is received, the DUQ 124 already includes an existing update 404 having a priority 304 equal to 3. Accordingly, the enqueue request 402 is not collapsed with the existing update 404 due to the different priorities. Instead, as illustrated in the DUQ 124 on the right, a new update 406 is created and inserted into the DUQ 124 ahead of the existing update 404. This is because, even though the new update 406 has lower queue number 306, the new update 406 has higher priority 304, i.e., priority=5. The new update 406 is therefore enqueued ahead of the existing update 404 having a priority=3.

Figure 5:
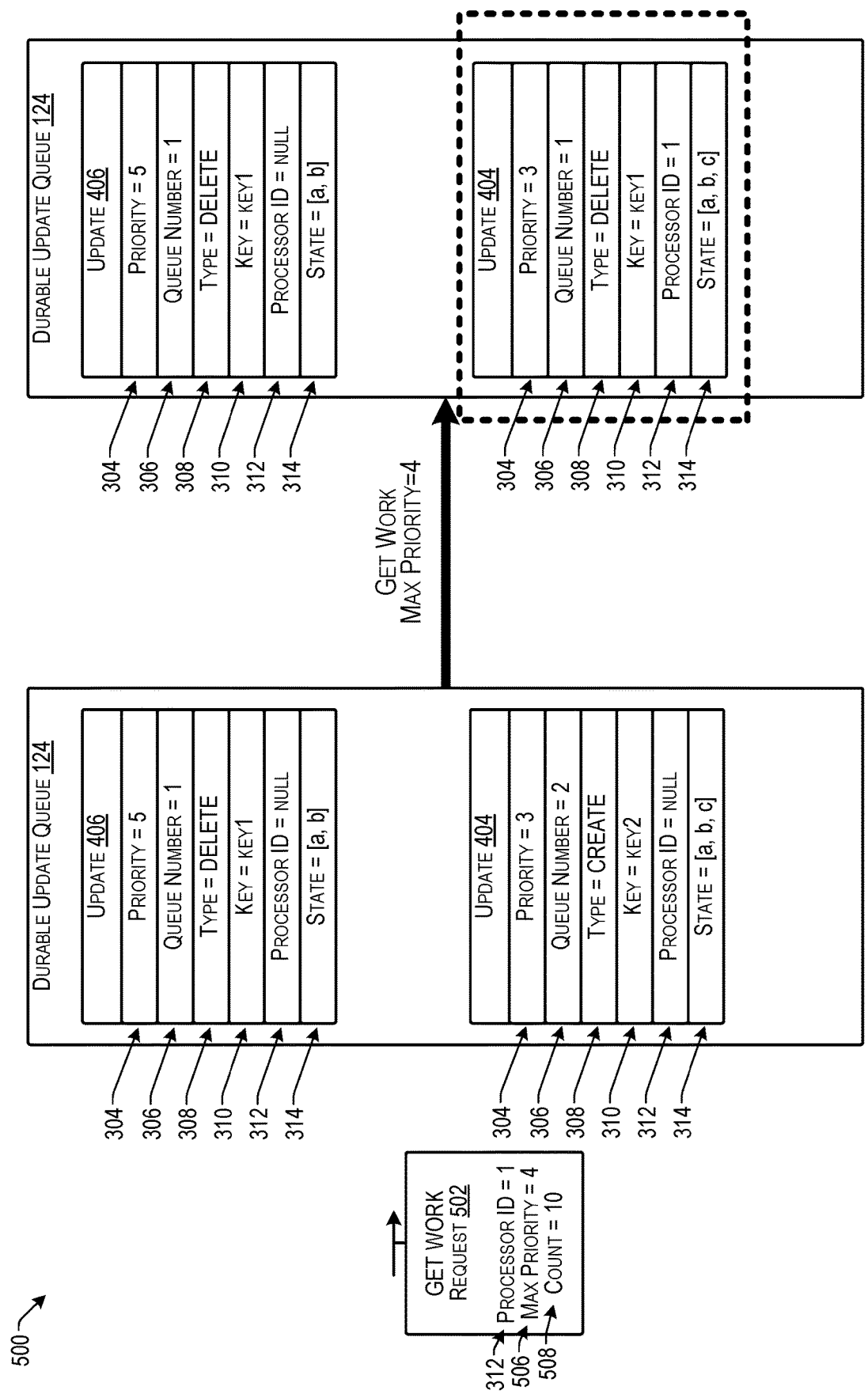
FIG. 5 is a block diagram illustrating an example of performing a get work operation according to some implementations.

FIG. 5 is a block diagram illustrating an example of performing a get work operation 500 according to some implementations. As mentioned above, the get work API may be employed for retrieving work from the DUQ 124. The get work API may takes a processor ID, max priority, and count as arguments. The get work API may obtain a list of one or more updates from the DUQ 124 for the processor calling the get work API to process. The list may be populated by finding the updates with the highest priority less than or equal to the specified max priority, up to the provided count number of updates. The get work API may then mark these updates with the provided processor ID of the requesting processor, and may persist the updates back into the DUQ 124 with the change to the processor ID 312, and return the list of selected updates to the requesting processor. The requesting processor is now able to operate on those updates without other processors also trying to obtain them. It is desirable to limit the number of updates retrieved by an individual get work call because there could be many thousands of events in the DUQ 124. This number of events may be more than the process running either the DUQ 124 or the queue processor is able to handle. Accordingly, a count attribute may limit the number of updates included in the returned list. Updates that have been retrieved via the get work request may not be returned by a different get work request, and may not be eligible to be collapsed during an enqueue request.

In the example of FIG. 5, a get work request 502 is received from a processor having a processor ID 312 of 1. The get work request 502 further includes a max priority 504 equal to 4 and a count 506 equal to 10. Thus, the get work request 502 includes a max priority 506 below the priority 304 of the update 406 that is currently at the head of the DUQ 124. Instead, the second update 404 may be returned because the priority 304 of the update 404 less than or equal to the max priority 506 specified in the get work request 502. This feature exists so that it is possible to prevent high priority updates from starving the lower priority updates that might have been in the DUQ 124 for a longer period of time. Also as a result of the get work request, the update 404 in the DUQ 124 is modified so that the processor ID 312 in the update 404 is changed from null to processor ID=1. Thus, in the list that is returned to the processor that sent the get work request 502, the update 404 has a processor ID set to the value of the processor ID that was included in the get work request 502. Responses to future get work requests from any processor may not include the update 404 because a processor ID has been assigned to update 404. In addition, as discussed below, a list in progress request may only return the update 404 if the processor ID in the list in progress request is the same as the processor ID in the update 404.

Figure 6:
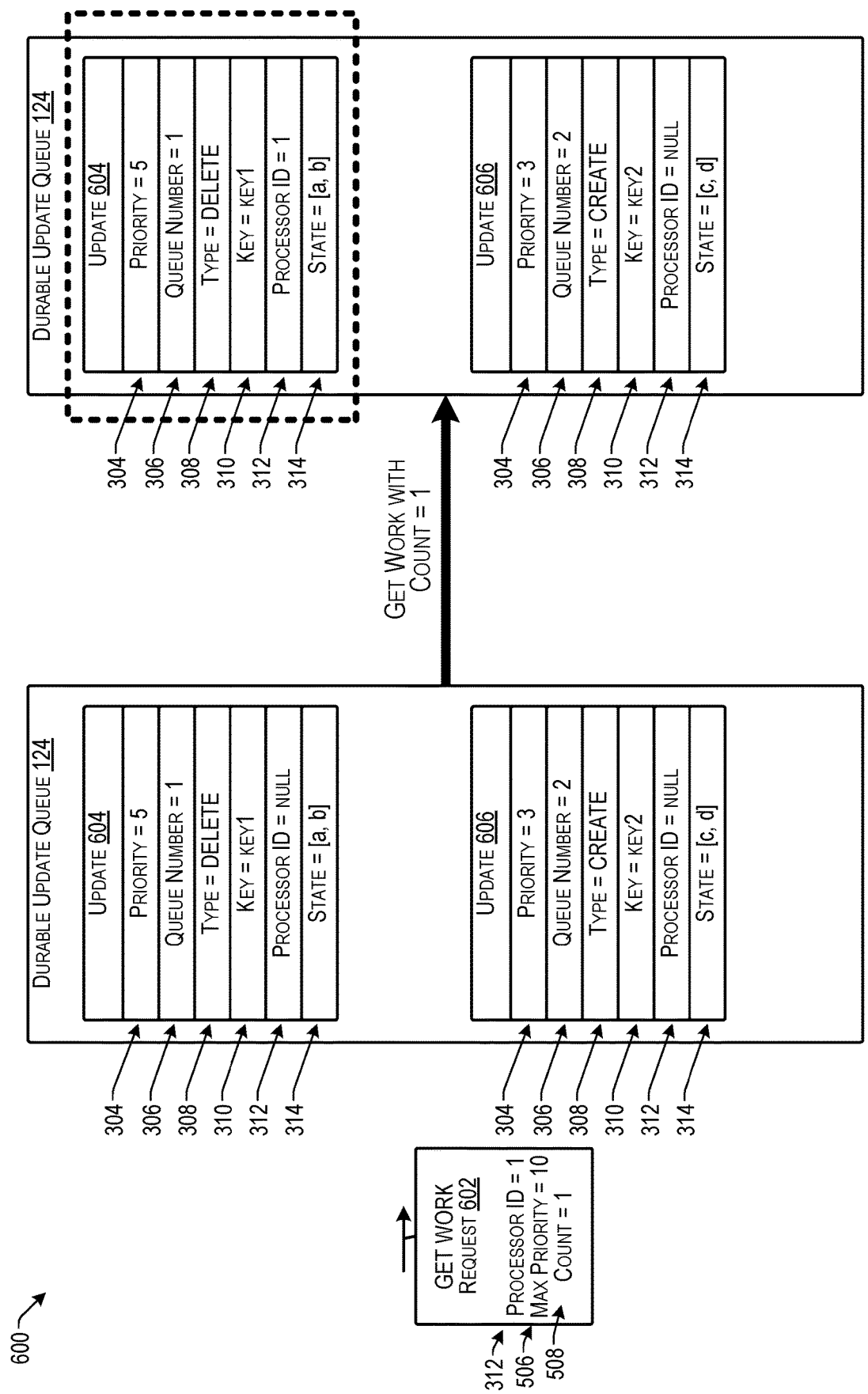
FIG. 6 is a block diagram illustrating an example of performing a get work operation according to some implementations.

FIG. 6 is a block diagram illustrating an example of performing a get work operation 600 according to some implementations. In this example, a get work request 602 is received that includes a processor ID 312 equal to 1, a max priority 506 of 10, and a count 508 equal to 11. Furthermore, the DUQ 124 in this example currently includes an update 602 having a priority=5 and an update 604 having a priority=3. With the arguments provided in the get work request 602, the update 604 at the head of the DUQ 124 is selected for processing and is returned in the list. Further, the processor ID 312 in the update 604 is changed from "null" to "1". The second update 606 is not returned because the get work request 602 specified the response should only include one result, as indicated by the count parameter 508. Thus, even if there are a large number of updates in the DUQ 124 to be performed, DUQ 124 consumers are able to limit the amount of work retrieved according to their own availability.

Figure 7:
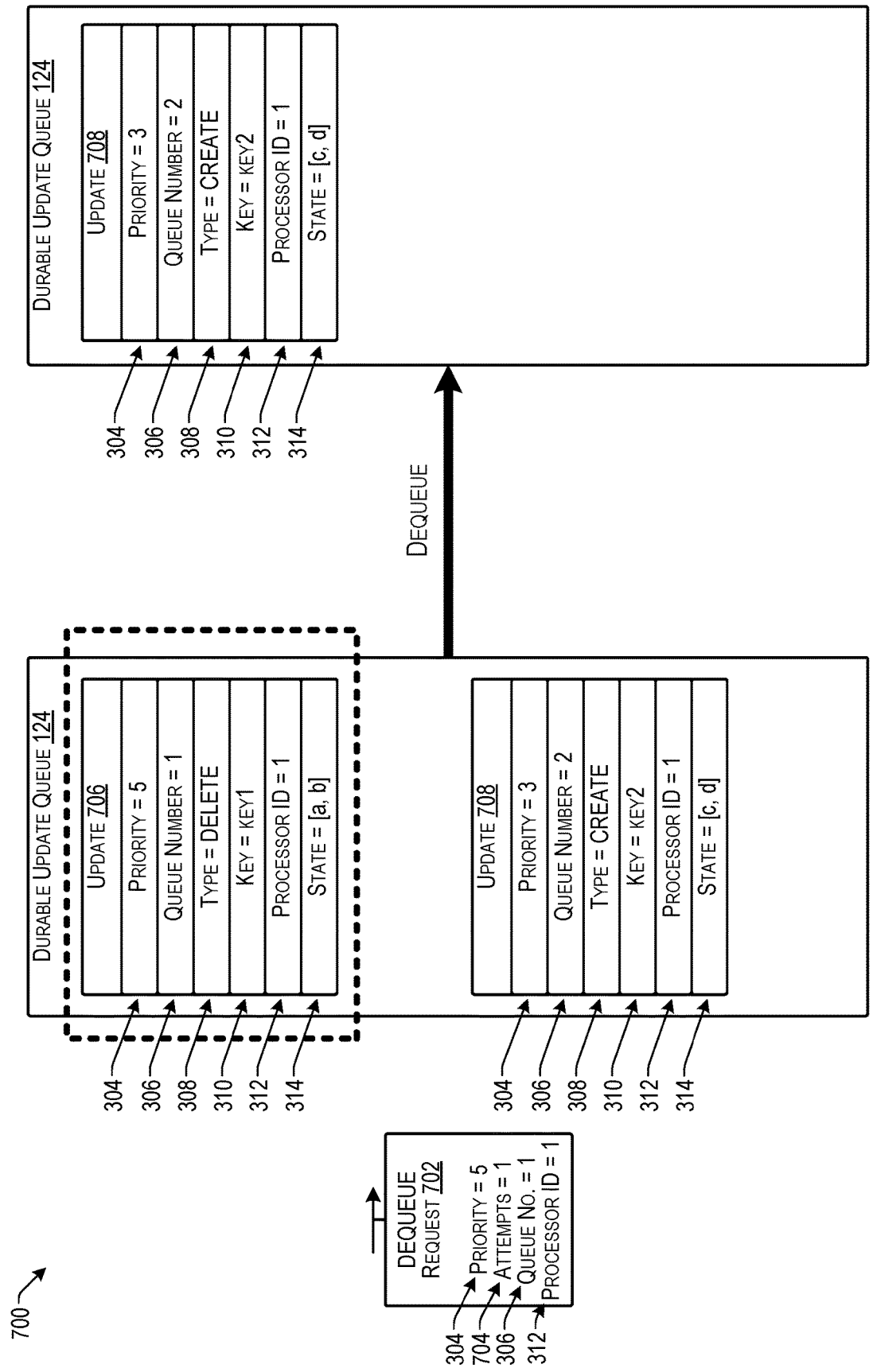
FIG. 7 is a block diagram illustrating an example of performing a dequeue operation according to some implementations.

FIG. 7 is a block diagram illustrating an example of performing a dequeue operation 700 according to some implementations. As mentioned above, the dequeue API may be employed for cleaning up completed updates from the DUQ 124. The dequeue API may include priority, attempts, queue number, and processor ID as arguments. For example, the dequeue API may delete an update corresponding to a given priority and queue number, if the update's processor ID is equal to the processor ID included in the dequeue request 702. If an update's processor ID is not equal to the processor ID provided, then an error is thrown because the processor with the provided ID should not be processing the update being dequeued. Updates should be being processed by a processor in order to be dequeued, so there is no way to dequeue an update without first getting and processing the update via the get work API. In addition, the dequeue API may be used by the system to mark updates as completed. This means that the updates will no longer appear in the DUQ 124 or be returned by any API requests.

In the example of FIG. 7, a dequeue request 702 is received. The dequeue request 702 includes a priority 304 equal to 5, an attempts 704 equal to 1, a queue number 306 equal to 1, and a processor ID 312 equal to 1. The dequeue request 702 locates and removes the matching update from the DUQ 124. In this case, the update 706 matches the parameters specified in the dequeue request 702, and is removed from the DUQ 124, resulting in the update 708 moving to the head of the DUQ 124. If the processor ID in the dequeue request 702 did not match the processor ID 312 of the update 706, then the dequeue request 702 may have failed and resulted in an error message being generated.

Figure 8:
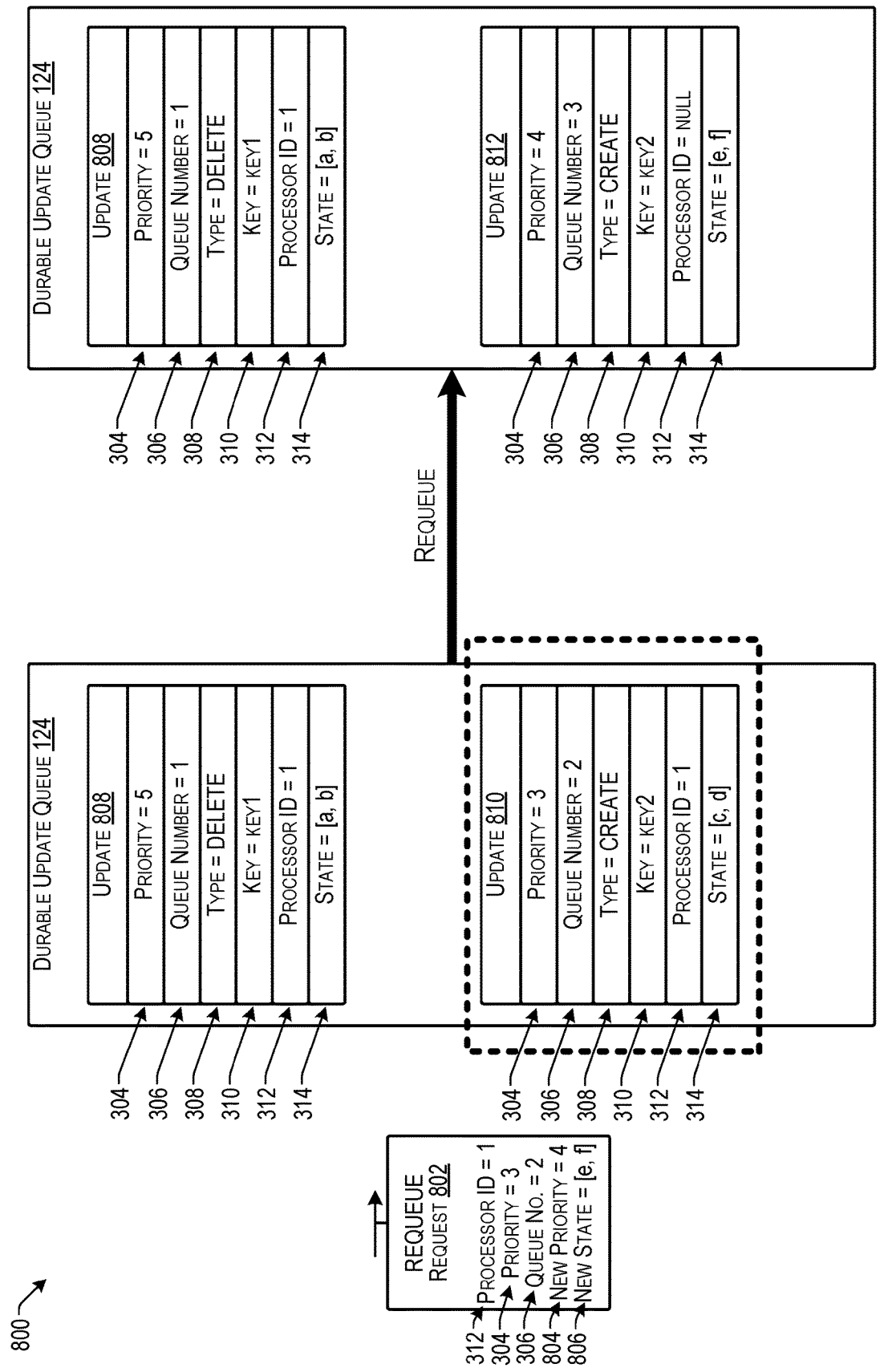
FIG. 8 is a block diagram illustrating an example of performing a requeue operation according to some implementations.

FIG. 8 is a block diagram illustrating an example of performing a requeue operation 800 according to some implementations. As mentioned above, the requeue API may be employed for putting incomplete work back into the DUQ 124 so that the incomplete update may be further processed, such as by other processors. The requeue API takes a processor ID, priority, queue number, new priority, and new state as arguments. The requeue API may first remove the update matching the provided priority and queue number if the existing update's processor ID matches the provided processor ID. If the existing update's processor ID does not match the one provided in the requeue request, then an error message may be generated to an administrator, or the like, because the processor with the provided ID should not be processing the update being requeued. To the contrary, to requeue an update, the update must no longer be being processed by a processor, so there is no way of requeuing an update without first getting the update via the get work API. After the existing update has been removed from the DUQ 124, a new update may be enqueued by calling the enqueue API above, with the arguments as: priority=new priority, type=existing update type, key=existing update key, state=new state. The requeue API is used by the system to put work back into the DUQ 124 that has not been completed, typically due to an error that prevented further processing.

In the example of FIG. 8, a requeue request 802 is received. The requeue request includes a processor ID 312 equal to 1, a priority 304 equal to 3, a queue number 306 equal to 2, a new priority 804 equal to 4, and a new state 806 of [e, f]. Thus, the requeue request 802 matches the update 810 the update with queue number 2 and priority 3 is being requeued. This could happen for any number of reasons, such as the queue consumer encountering an error while trying to process the update 810 and wants the update 810 to be reprocessed later, or the update 810 might not have been completely processed for some other reason. In a requeue, an existing update with the processor ID 312 matching the processor ID 312 in the requeue request should exist, along with matching priority 304 and queue number 306. In the illustrated example, the second update 810 in the DUQ 124 matches the requeue request 802, and is therefore requeued at update 812 with a new queue number 306 equal to 3, a priority 304 equal to 4, and a new state [e, f]. In the new update 812, the processor ID 312 is set to null, so any processor can handle the newly queued update 812. Further, the other existing update 808 is not affected by the actions of the requeue request in this example.

Figure 9:
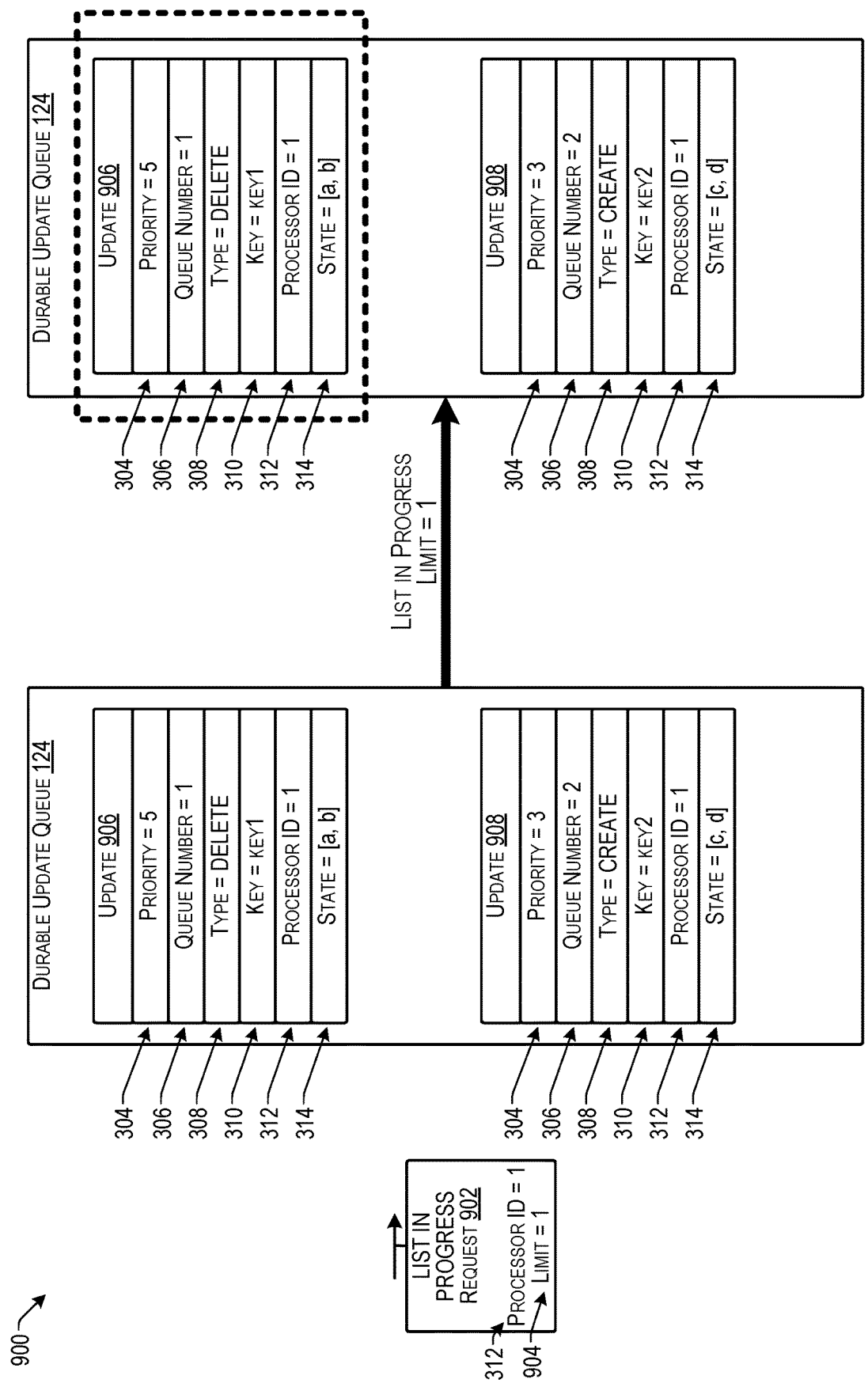
FIG. 9 is a block diagram illustrating an example of performing a list in progress operation according to some implementations.

FIG. 9 is a block diagram illustrating an example of performing a list in progress operation 900 according to some implementations. As mentioned above, the list in progress API may be employed for getting work that is already being processed by a processor. The list in progress API takes a processor ID and a limit as arguments. The list in progress API may retrieve, in the same order as the get work API, and up to the specified limit, updates that are currently being processed according to the DUQ 124 by the processor with the provided ID.

In the example of FIG. 9, a list in progress request is received. The list in progress request 902 includes a processor ID 312 equal to 1, and limit 904 equal to 1. The update 906 at the head of the DUQ 124 having a matching processor ID 312 may returned. If the processor IDs had not matched, then update 906 would not have been returned and instead the second update 908 may have been returned. Accordingly, similar to the get work request, the list in progress request 902 has the ability to limit the total number of updates returned in response to a single request. In this example, only a single update is returned based on the limit 904 being equal to 1.

Figure 10:
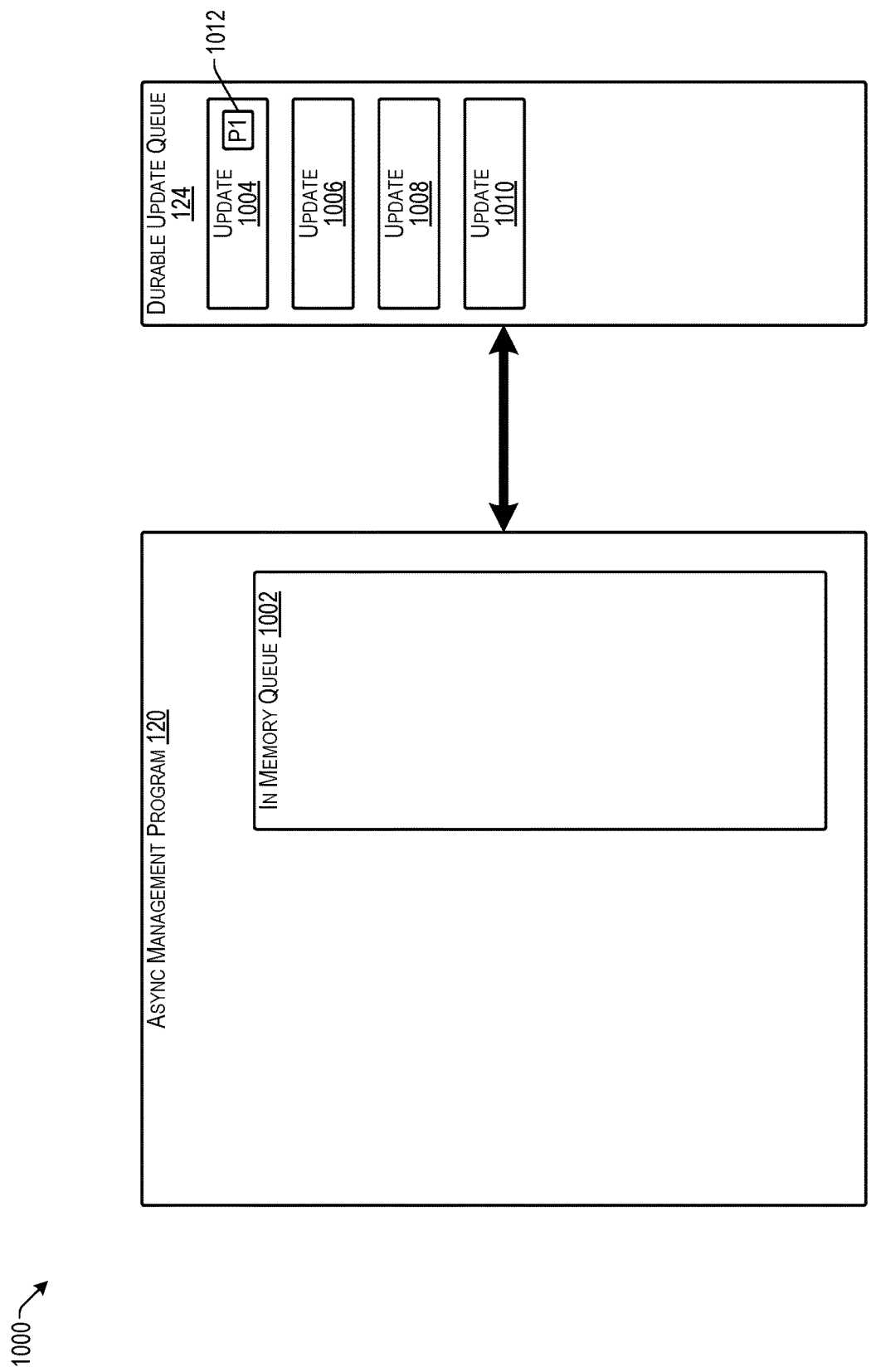
FIG. 10 is a block diagram illustrating an example operation of the async management program according to some implementations.

FIG. 10 is a block diagram illustrating an example operation 1000 of the async management program 120 according to some implementations. The example of FIG. 10 illustrates a state of the async management program 120 at start up. At this point, the async management program 120 has no workers, but does include or is able to access an in memory queue 1002, and knows the location in memory of the DUQ 124. In this example, the DUQ 124 includes four existing updates 1004-1010 ready to be consumed. The async management program 120 may be configured to consume updates from the DUQ 124.

In this example, suppose that update 1004 is marked with a processor ID 1012 in the update 1004 (i.e., processor ID "P1"), which indicates that the update 1004 is in progress, such as following the execution of a get work request, e.g., as discussed above with respect to FIGS. 5 and 6. As one non-limiting example, suppose that processing of the update 1004 may have started, but may have been interrupted or otherwise not completed. After the async management program 120 starts, the async management program 120 may perform operations such as those described with respect to FIGS. 11-18.

Figure 11:
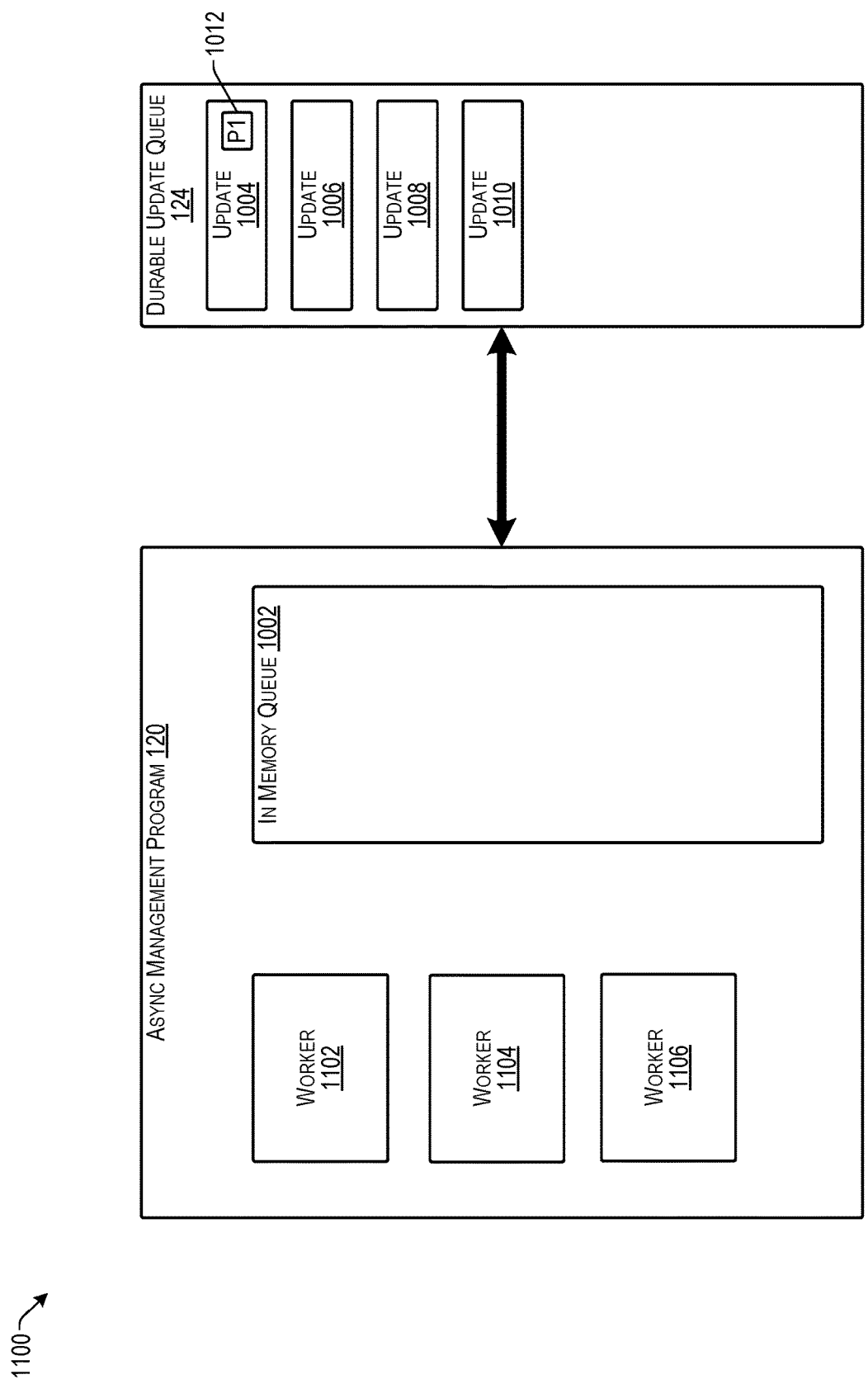
FIG. 11 is a block diagram illustrating an example operation of the async management program according to some implementations.

FIG. 11 is a block diagram illustrating an example operation 1100 of the async management program 120 according to some implementations. In this example, the async management program 120 starts a group of workers 1102, 1104, and 1106 to execute for consuming updates from the DUQ 124 or otherwise perform operations on the DUQ 124. As an example, the workers 1102-1106 may correspond to a plurality of processes, respectively, executed by the processor(s) executing the async management program 120 for processing updates maintained in the DUQ 124.

Figure 12:
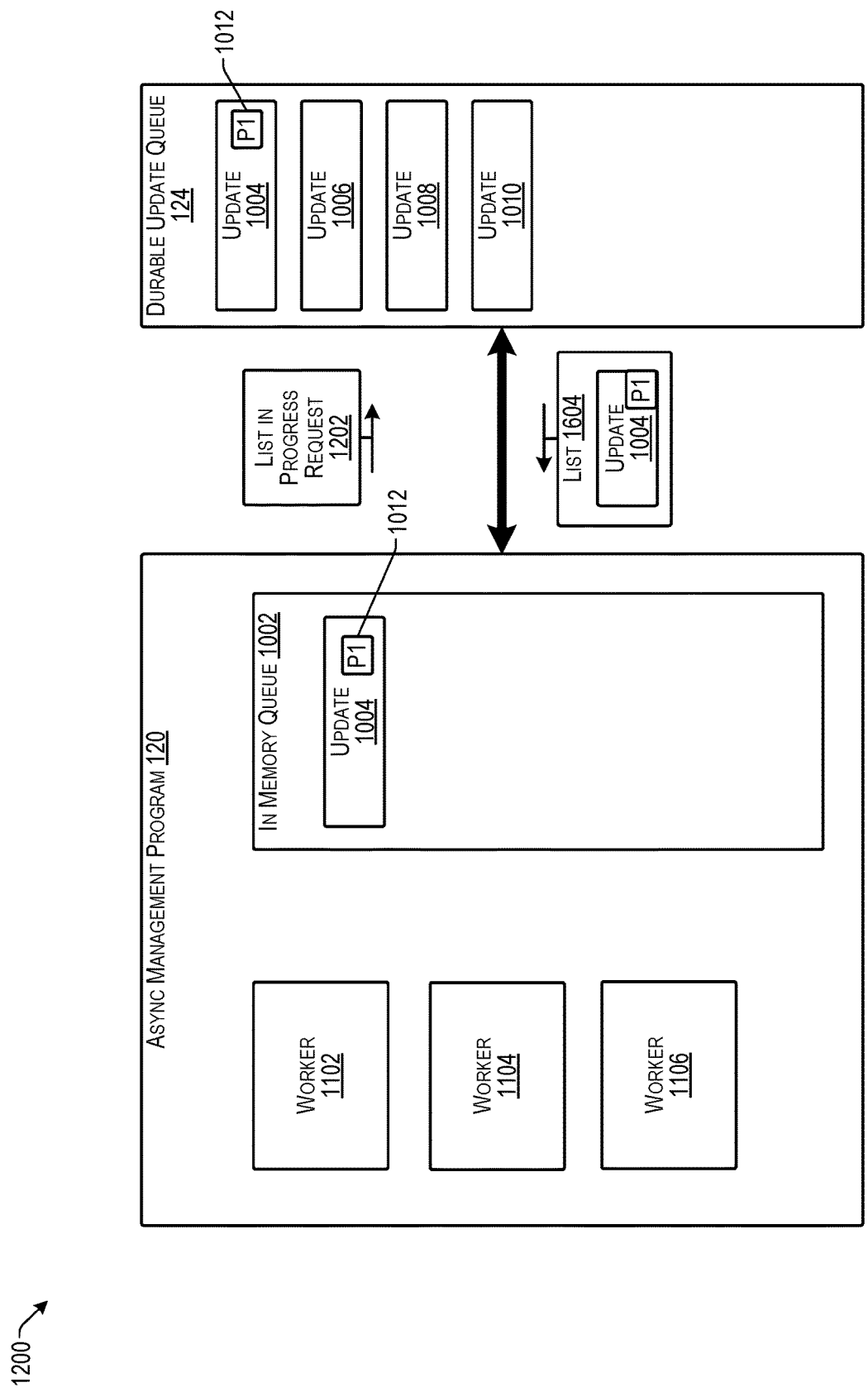
FIG. 12 is a block diagram illustrating an example operation of the async management program according to some implementations.

FIG. 12 is a block diagram illustrating an example operation 1200 of the async management program 120 according to some implementations. In this example, the async management program 120 may start looking for work that it did not complete when it was previously run. The async management program 120 does so by making a list in progress request against the DUQ 124. Thus, the async management program 120 makes a list in progress API request 1202 against the DUQ 124 to determine if there are any updates for which processing was started, but not completed the last time the async management program 120 was executed. For example, the list in progress request may use the processor ID of the processor executing the async management program 120 as a parameter, and may further include a limit as a parameter, e.g., as discussed above with respect to FIG. 9. The async management program 120 may add the list of any retrieved updates into the in-memory queue 1002 for the workers 1102-1106 to consume. If no new updates are retrieved, the async management program 120 may execute a get work request as discussed below with respect to FIG. 16, and may skip FIGS. 13-15.

In the illustrated example, suppose that the processor ID of the processor executing the async management program 120 matches the processor ID 1012 marking the update 1004 (i.e., "P1"). Accordingly, the update 1004 is returned in response to the list in progress request 1202, which means that its processor ID was equal to this async management program's processor. The async management program 120 may put the update 1004 into its in memory queue 1002.

Figure 13:
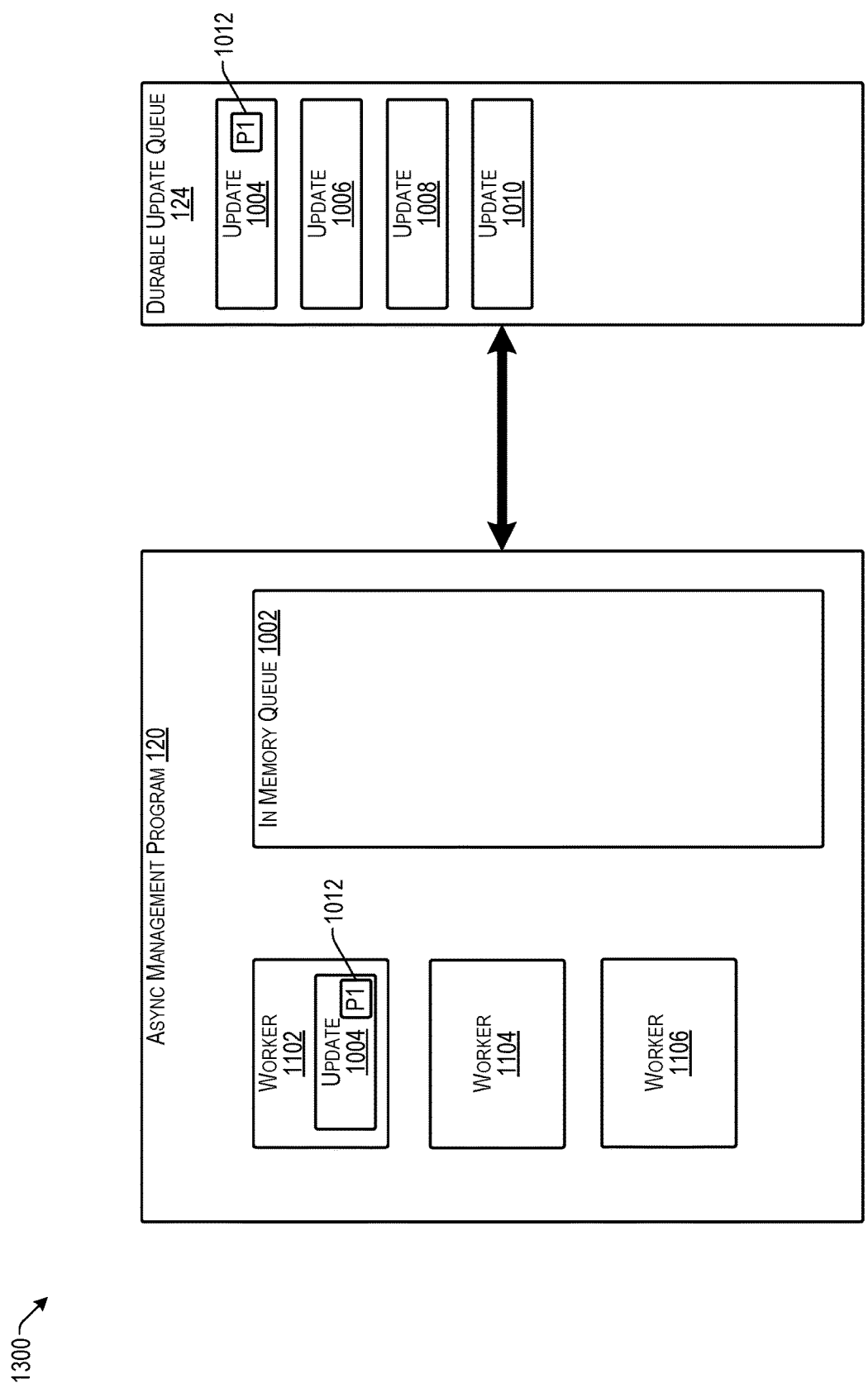
FIG. 13 is a block diagram illustrating an example operation the async management program according to some implementations.

FIG. 13 is a block diagram illustrating an example operation 1300 of the async management program 120 according to some implementations. In the example of FIG. 13, the async management program 120 may process any in progress updates located by the operation in FIG. 12 above. For example, the async management program 120 may wait for all of the updates to be processed by one or more workers of the group of workers 1002-1006 before getting another batch of updates. In the example of FIG. 13, the worker 1102 has retrieved the update 1004 from the in memory queue 1002. In some cases, the async management program 120 might not make any more requests to the DUQ 124 until the worker 1102 has completed processing the update 1004.

Figure 14:
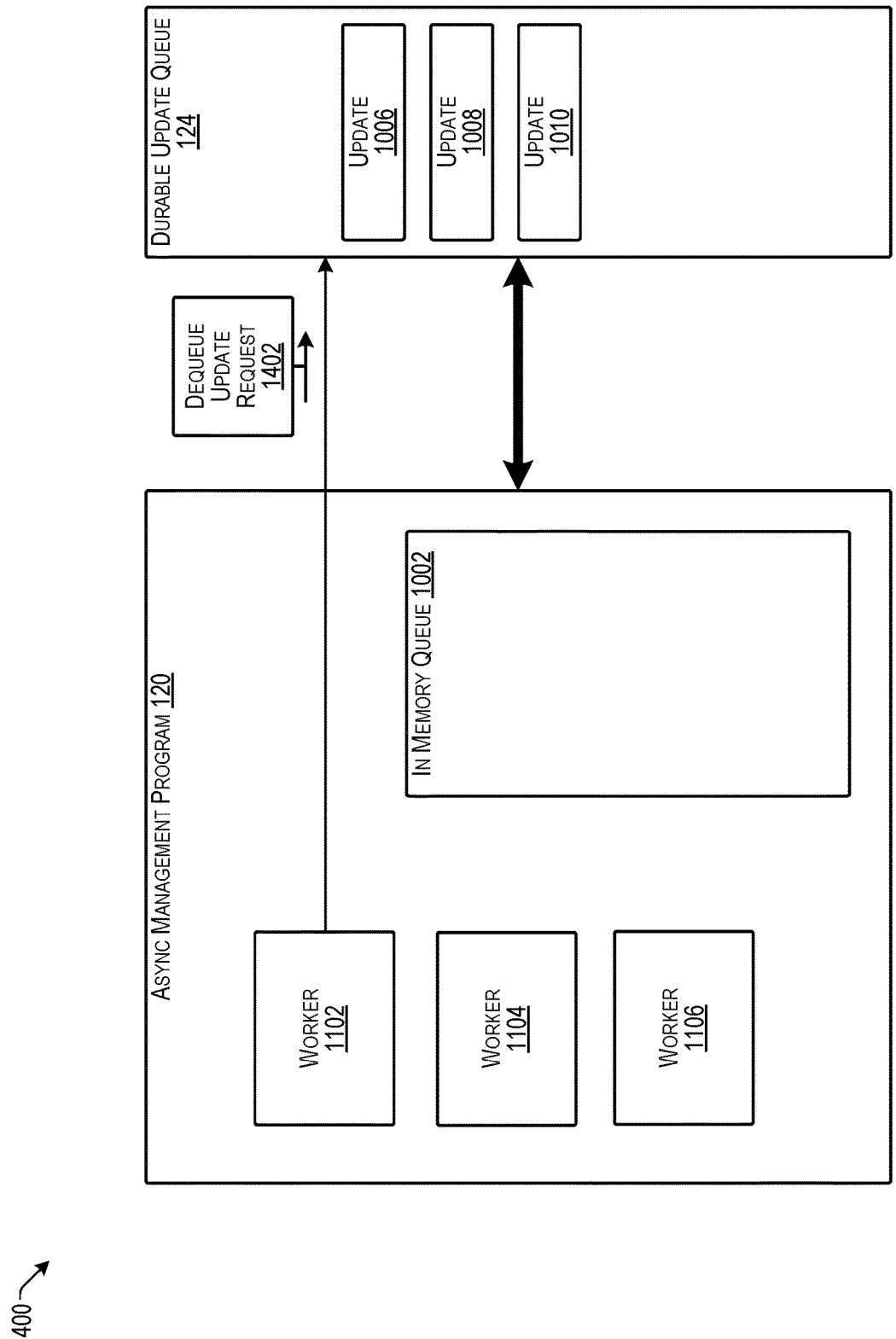
FIG. 14 is a block diagram illustrating an example operation of the async management program according to some implementations.

FIG. 14 is a block diagram illustrating an example operation 1400 of the async management program 120 according to some implementations. In this example, following completion of processing the update 1004, the worker 1102 may send a dequeue update request 1402 to dequeue the update 1004 from the DUQ 124. The update 1004 is then removed from the DUQ 124. Accordingly, in some examples herein, updates are not removed from the DUQ 124 until a dequeue request is made, e.g., as discussed above with respect to FIG. 7. For example, by calling the dequeue request only after the update is done processing, the system ensures that updates are completed according to the DUQ 124.

Figure 15:
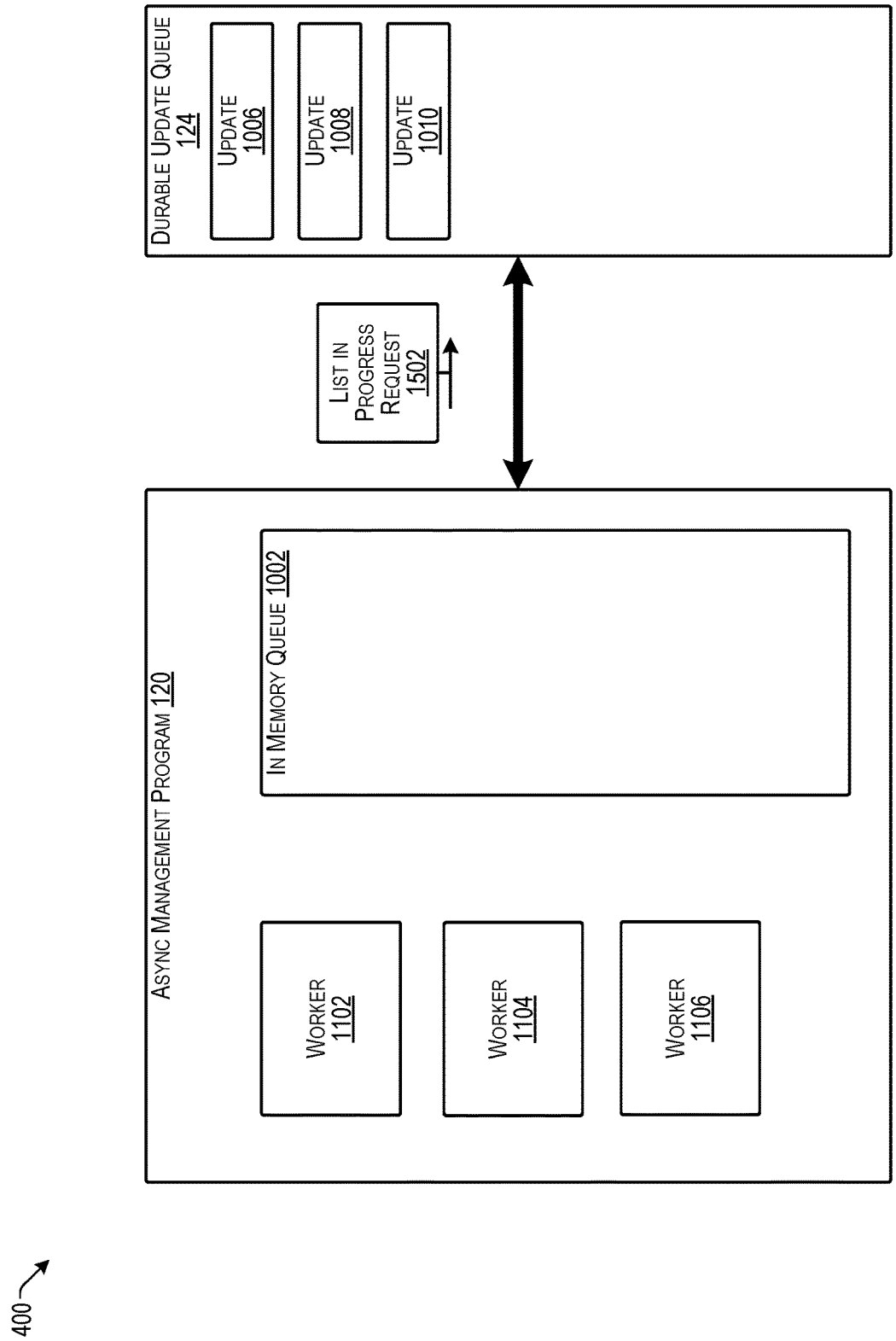
FIG. 15 is a block diagram illustrating an example operation of the async management program according to some implementations.

FIG. 15 is a block diagram illustrating an example operation 1500 of the async management program 120 according to some implementations. In this example, the async management program 120 makes another request to determine anymore in-progress updates by sending a list in progress request 1502. This time, no in-progress updates are returned, which indicates that the async management program 120 has completed processing of all the in-progress work that was not previously finished and can now get new work.

Figure 16:
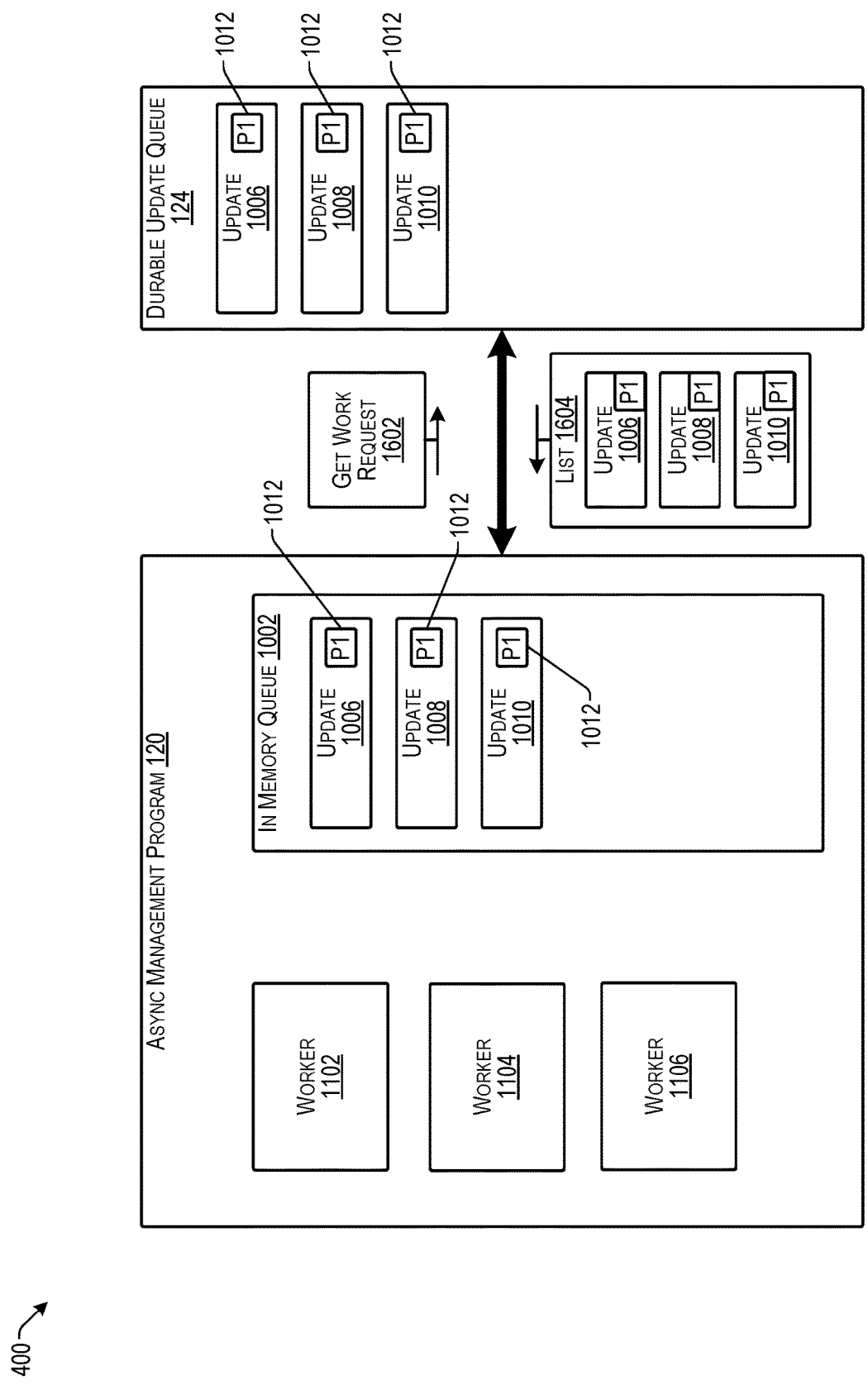
FIG. 16 is a block diagram illustrating an example operation of the async management program according to some implementations.

FIG. 16 is a block diagram illustrating an example operation 1600 of the async management program 120 according to some implementations. In this example, suppose that the async management program makes a get work request 1602 as an API call against the DUQ 124, using its processor ID, the max priority, and some limit of 3 or greater as arguments. For example, to avoid causing the async management program 120 to run out of memory, the async management program 120 may be configured to not retrieve additional updates when the in-memory queue 1002 is above a threshold size.

In response to the get work request 1602, suppose that a list 1604 of three updates 1006, 1008, and 1010 is returned. Each of the updates 1006, 1008 and 1010 may be marked in the DUQ 124 with the processor ID 1012 of the processor executing the async management program 120 (i.e., processor ID "P1"). The async management program 120 may add all of the retrieved updates into the same in-memory queue 1002. Accordingly, the DUQ 124 has returned three new updates 1006-1010 for processing, all of which now have the async management program's processor ID 1012 added to them in the DUQ 124, as discussed above with respect to FIGS. 5 and 6 to prevent other consumers from possibly consuming those updates.

Figure 17:
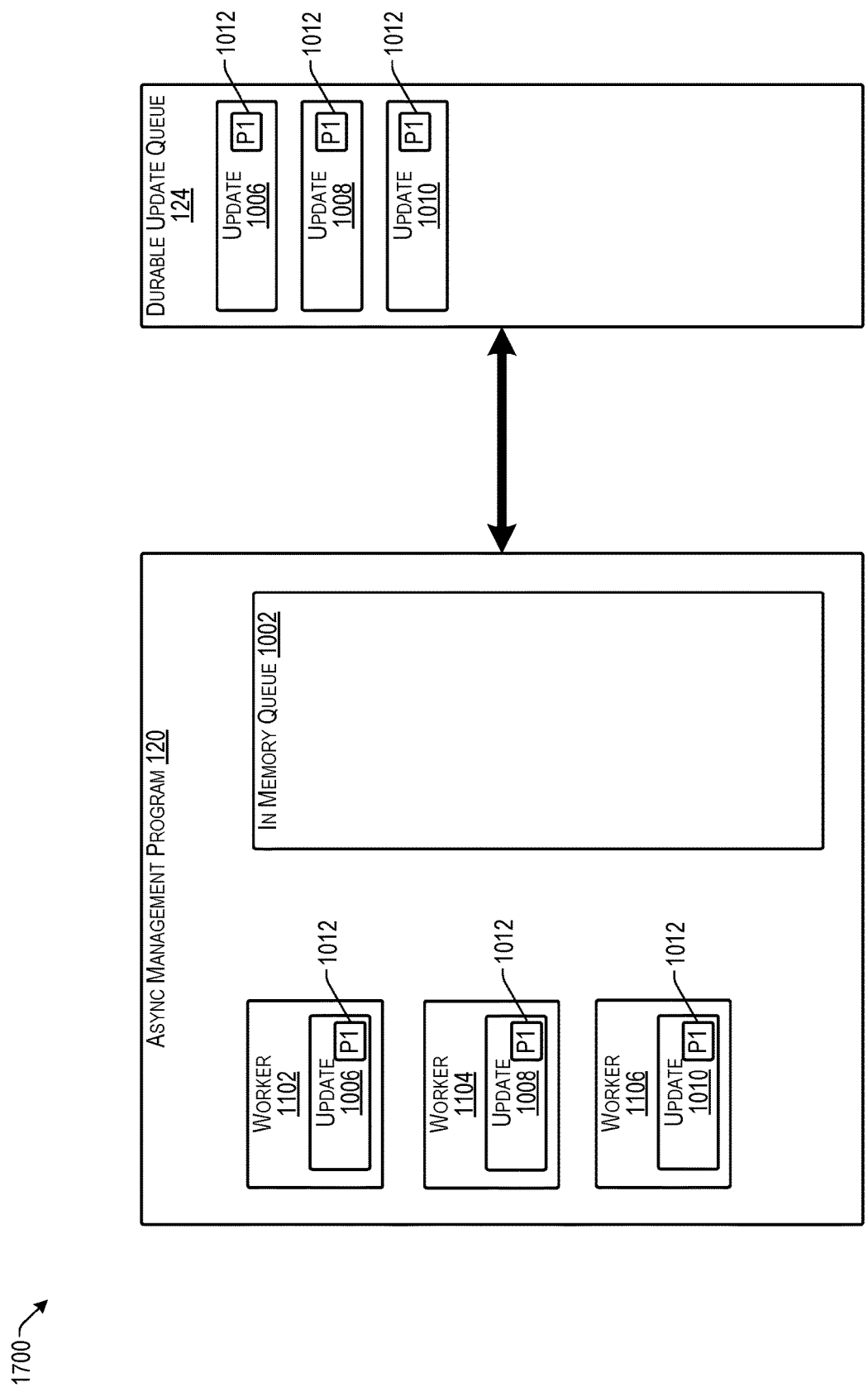
FIG. 17 is a block diagram illustrating an example operation of the async management program according to some implementations.

FIG. 17 is a block diagram illustrating an example operation 1700 of the async management program 120 according to some implementations. The async management program 120 provides the workers 1102-1106 inside the async management program 120 with a respective update to process. The workers 1102-1106 begin processing the updates 1006-1010, respectively.

Figure 18:
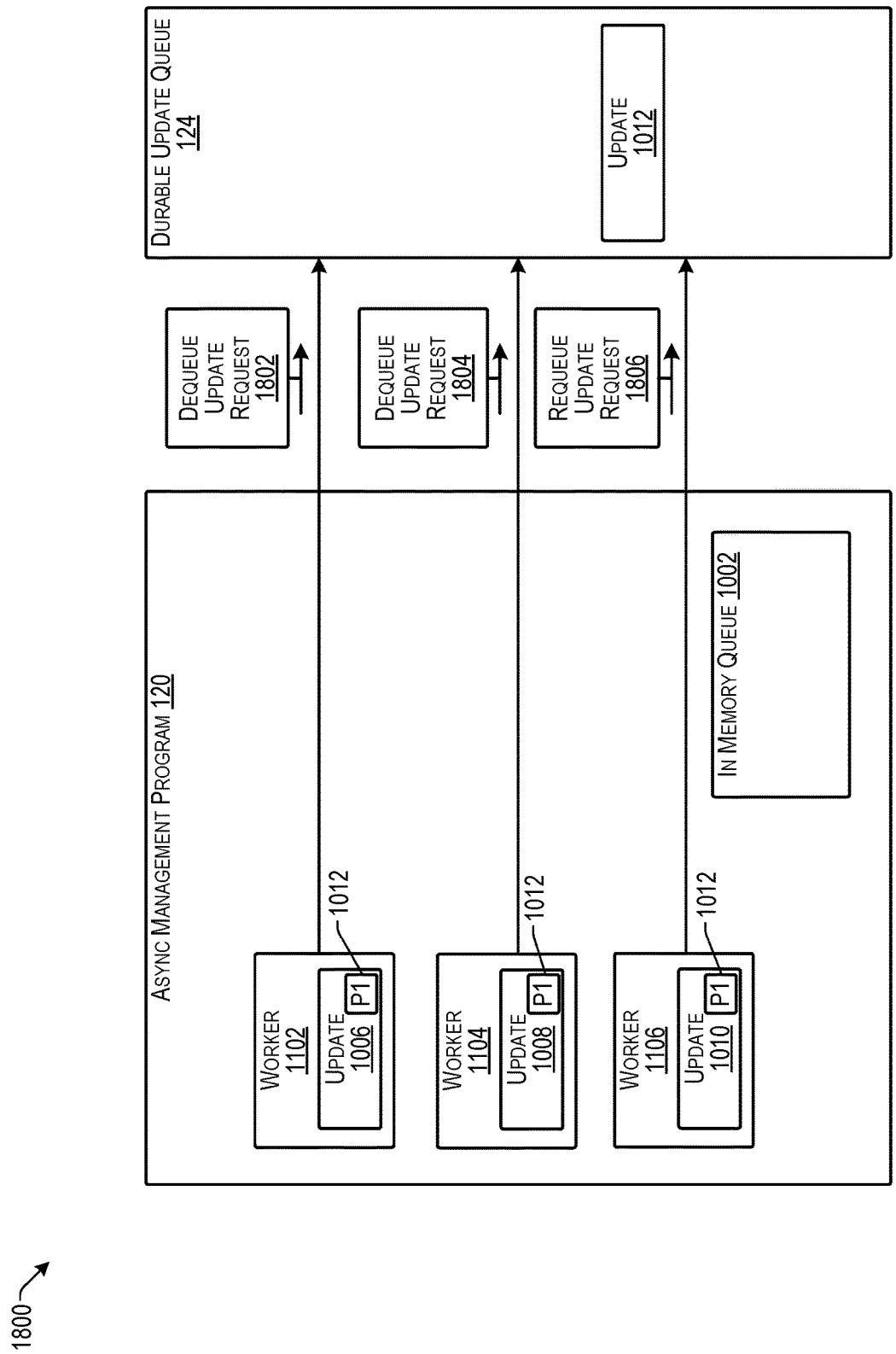
FIG. 18 is a block diagram illustrating an example operation of the async management program according to some implementations.

FIG. 18 is a block diagram illustrating an example operation 1800 of the async management program 120 according to some implementations. In this example, suppose that the async management program workers 1102-1106 have all done something with their tasks. For example, suppose that workers 1102 and 1104 have successfully completed the updates 1006 and 1008, respectively. Accordingly, the worker 1102 sends a dequeue update request 1802 to dequeue the update 1006 from the DUQ 124, and the worker 1104 sends a dequeue update request 1804 to dequeue the update 1008 from the DUQ 124.

On the other hand, suppose that the third worker 1106 did not successfully complete the update 1010. Consequently, the third worker 1106 may send a requeue update request 1806 as discussed below, e.g., with respect to FIG. 8. Thus, an update 1012 is requeued. For example, the update 1010 may have encountered an error during processing or may require additional processing. The update 1012 may be different in one or more attributes from the original update 1010, such as in priority, state, or so forth, based on processing that may have already been completed by the worker 1106 when processing the update 1010.

When processing an update, the async management program worker 1102-1106 may first obtain the update from the in-memory queue 1002, such as based on order of priority or the like. After the worker has obtained the update from the in-memory queue 1002, no other worker will attempt to operate on that update.

For each update it processes, the worker may first determine what kind of update the worker is processing, such as based on the type attribute 308 discussed above with respect to FIGS. 3-9. From this, the worker may determine how to process the update using the key attribute 310 and state attribute 314 discussed above for further context. For example, if a secondary index needs to be updated, the worker might use the key of the update to look up the current information about that key from the primary index, and then update the secondary index to have the updated information. This may be a common use case for updates listed in the DUQ 124.

Another possible use for an update is to drive some other asynchronous process. For example, an update might be inserted into the DUQ 124 by a first process to trigger the execution of a first policy. For example, suppose that the first policy then, in turn, causes updates to be made that changes the condition of one or more stored objects, object metadata, or the like. This scenario may correspond with the example discussed above in which a policy to add tags to videos with certain characteristics is performed on a subset of a plurality of videos stored in a storage location. For example, the triggered policy might find videos in the data set with a specified characteristic, and may further add an update to the DUQ 124 to process that individual video. The updates to the videos may be processed in turn, such as for add a tag to the videos that meet the certain characteristics. Furthermore suppose that as part of applying a tag to that video, yet another update is added to the DUQ 124 that causes another policy to be executed, such as for compressing any of the tagged videos that exceed a certain file size on storage.

If an update fails to be processed for some reason, then the update may be requeued using the requeue API of the DUQ 124, e.g., as discussed above with respect to FIGS. 8 and 18. An update might fail for any of a number of reasons. For example if the video failed to be read in the above example, the update to the video may be requeued and retried when the update next comes out of the DUQ 124. Furthermore, while several example configurations and applications have been discussed above, numerous other variations will be apparent to those of skill in the art having the benefit of the disclosure herein.

Figure 19:
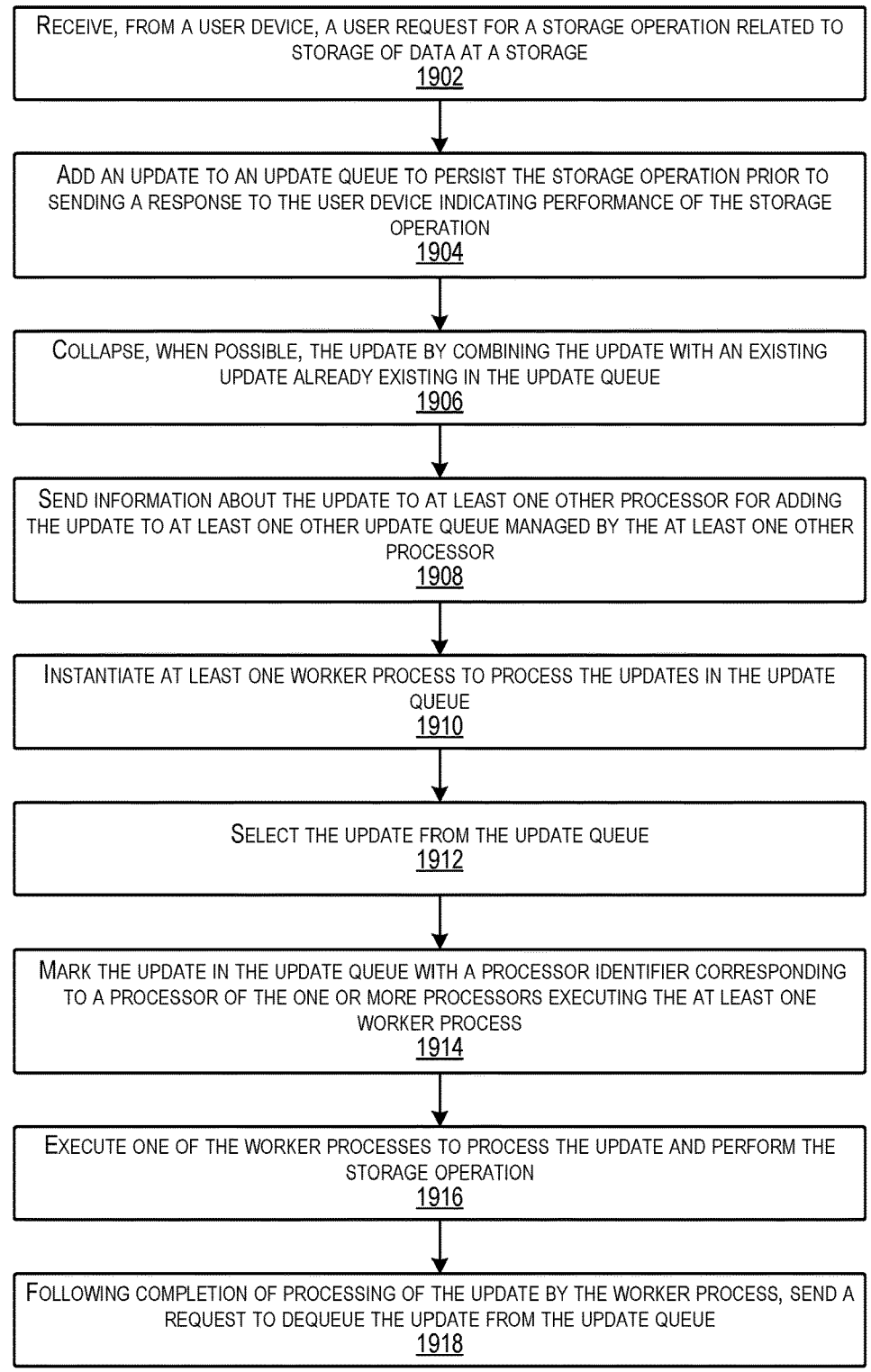
FIG. 19 is a flow diagram illustrating a process for employing a durable update queue to manage updates according to some implementations.

FIG. 19 is a flow diagram illustrating an example process according to some implementations. The process is illustrated as a collection of blocks in a logical flow diagram, which represents a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, frameworks, and systems described in the examples herein, although the process may be implemented in a wide variety of other environments, frameworks, and systems.

FIG. 19 is a flow diagram illustrating an example process 1900 for employing a durable update queue to manage updates according to some implementations. In some cases, the process 1900 may be executed at least in part by the one or more service computing devices 102.

At 1902, the computing device may receive, from a user device, a user request for a storage operation related to storage of data at a storage.

At 1904, the computing device may add an update to an update queue to persist the storage operation prior to sending a response to the user device indicating performance of the storage operation.

At 1906, the computing device may collapse, when possible, the update by combining the update with an existing update already existing in the update queue.

At 1908, the computing device may send information about the update to at least one other processor for adding the update to at least one other update queue managed by the at least one other processor.

At 1910, the computing device may instantiate at least one worker process to process the updates in the update queue.

At 1912, the computing device may select the update from the update queue.

At 1914, the computing device may mark the update in the update queue with a processor identifier corresponding to a processor of the one or more processors executing the at least one worker process.

At 1916, the computing device may execute one of the worker processes to process the update and perform the storage operation.

At 1918, following completion of processing of the update by the worker process the computing device may, send a request to dequeue the update from the update queue.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as programs stored on computer-readable media, and executed by the processor(s) herein. Generally, programs include applications, routines, objects, components, data structures, executable code, etc., for performing particular tasks or implementing particular abstract data types. These programs, and the like, may be executed as native code or may be downloaded and executed, such as in a virtual machine or other just-in-time compilation execution environment. Typically, the functionality of the programs may be combined or distributed as desired in various implementations. An implementation of these modules and techniques may be stored on computer-readable storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
a first set of one or more computing devices located at a first geographic location and configured by executable instructions to perform operations comprising:
receiving, from a user device, a user request for a storage operation related to storage of data at a storage;
adding an update to an update queue to persist the storage operation prior to sending a response to the user device indicating performance of the storage operation, wherein adding the update to the update queue includes sending a request to cause the update to be added to the update queue, wherein the request specifies at least a type of the storage operation and a state to be achieved by the storage operation, wherein adding the update to the update queue includes collapsing the update by combining the update with an existing update already present in the update queue, wherein the combining the update with the existing update is based at least in part on the update and the existing update including a same specified type of storage operation;

sending information about the update to a second set of one or more computing devices located at a second geographic location, which is different from the first geographic location, for adding the update to a redundant copy of the update queue managed by the second set of one or more computing devices; and subsequently obtaining the update from the update queue and processing the update to perform the storage operation by:

executing a worker process to process the existing updates in the update queue:

selecting the update from the update queue for processing;

marking the update in the update queue with a processor identifier corresponding to a processor of the first set of one or more computing devices executing the worker process; and executing the worker process to perform the storage operation, wherein the processor identifier marking the update in the update queue indicates to another processor that accesses the update queue seeking existing updates to process that the update in the update queue is being processed by the processor corresponding to the processor identifier.

2. The system as recited in claim 1, wherein the operation of collapsing the update is performed via an application programming interface that receives, as arguments, a priority, the type of the storage operation, a key, and the state to be achieved by the storage operation, wherein the combining includes combining the state to be achieved by the storage operation with a state to be achieved by a storage operation of the existing update.

3. The system as recited in claim 2, wherein combining the update with the existing update is based in part on the update and the existing update including a same designated priority.

4. The system as recited in claim 1, the operations further comprising, following completion of processing of the update by the worker process, sending a request to dequeue the update from the update queue.

5. The system as recited in claim 1, the operations further comprising following a failure to complete the processing of the update, sending, by the worker process, a request to requeue the update as a new update with an updated state based on partial processing of the update.

6. The system as recited in claim 1, further comprising, prior to obtaining the update from the update queue, sending a request to determine an already existing update being processed and not completed based at least partially on matching the processor identifier with a processor identifier indicated in the already existing update in the update queue.

7. The system as recited in claim 1, wherein subsequently obtaining the update from the update queue comprises specifying at least one of a maximum priority for retrieved updates or a maximum number of retrieved updates.

8. The system as recited in claim 1, wherein the operation of sending information about the update to the second set of one or more computing devices at the second geographic location for adding the update to the redundant copy of the update queue comprises sending the information according to a consensus algorithm in which the first set of one or more computing devices acts as a leader that replicates updates to the update queue to the second set of one or more computing devices configured as a follower to maintain consistency, based on the consensus algorithm, between the update queue at the first geographic location and the copy of the update queue at the second geographic location.

9. A method comprising:

receiving, by a first set of one or more computing devices located at a first geographic location, from a user device, a user request for a storage operation related to storage of data at a storage;

adding, by the first set of one or more computing devices, an update to an update queue to persist the storage operation prior to sending a response to the user device indicating performance of the storage operation, wherein adding the update to the update queue includes sending a request to cause the update to be added to the update queue, wherein the request specifies at least a type of the storage operation and a state to be achieved by the storage operation, wherein adding the update to the update queue includes collapsing the update by combining the update with an existing update already present in the update queue, wherein the combining the update with the existing update is based at least in part on the update and the existing update including a same specified type of storage operation;

sending, by the first set of one or more computing devices, information about the update to a second set of one or more computing devices located at a second geographic location, which is different from the first geographic location for adding the update to a redundant copy of the update queue managed by the second set of one or more computing devices; and subsequently obtaining, by the first set of one or more computing devices, the update from the update queue and processing the update to perform the storage operation by:

executing a worker process to process the existing updates in the update queue;

selecting the update from the update queue for processing;

marking the update in the update queue with a processor identifier corresponding to a processor of the first set of one or more computing devices executing the worker process; and executing the worker process to perform the storage operation, wherein the processor identifier marking the update in the update queue indicates to another processor that accesses the update queue seeking existing updates to process that the update in the update queue is being processed by the processor corresponding to the processor identifier.

10. The method as recited in claim 9, wherein collapsing the update is performed via an application programming interface that receives, as arguments, a priority, the type of the storage operation, a key, and the state to be achieved by the storage operation, wherein the combining includes combining the state to be achieved by the storage operation with a state to be achieved by a storage operation of the existing update.

11. One or more non-transitory computer-readable media storing instructions that, when executed by a first set of one or more computing devices located at a first geographic location, configure the first set of one or more computing devices to perform operations comprising:

receiving, from a user device, a user request for a storage operation related to storage of data at a storage;

adding an update to an update queue to persist the storage operation prior to sending a response to the user device indicating performance of the storage operation, wherein adding the update to the update queue includes sending a request to cause the update to be added to the update queue, wherein the request specifies at least a type of the storage operation and a state to be achieved by the storage operation, wherein adding the update to the update queue includes collapsing the update by combining the update with an existing update already present in the update queue, wherein the combining the update with the existing update is based at least in part on the update and the existing update including a same specified type of storage operation;

sending information about the update to a second set of one or more computing devices located at a second geographic location, which is different from the first geographic location for adding the update to a redundant copy of the update queue managed by the second set of one or more computing devices; and subsequently obtaining the update from the update queue and processing the update to perform the storage operation by:

executing a worker process to process the existing updates in the update queue;

selecting the update from the update queue for processing;

marking the update in the update queue with a processor identifier corresponding to a processor of the first set of one or more computing devices executing the worker process; and executing the worker process to perform the storage operation, wherein the processor identifier marking the update in the update queue indicates to another processor that accesses the update queue seeking existing updates to process that the update in the update queue is being processed by the processor corresponding to the processor identifier.

12. The one or more non-transitory computer-readable media as recited in claim 11, wherein the operation of collapsing the update is performed via an application programming interface that receives, as arguments, a priority, the type of the storage operation, a key, and the state to be achieved by the storage operation, wherein the combining includes combining the state to be achieved by the storage operation with a state to be achieved by a storage operation of the existing update.

13. The one or more non-transitory computer-readable media as recited in claim 12, wherein the operation of combining the update with the existing update is based in part on the update and the existing update including a same designated priority.

14. The one or more non-transitory computer-readable media as recited in claim 11, wherein the operation of sending information about the update to the second set of one or more computing devices at the second geographic location for adding the update to the redundant copy of the update queue comprises sending the information according to a consensus algorithm in which the first set of one or more computing devices acts as a leader that replicates updates to the update queue to the second set of one or more computing devices configured as a follower to maintain consistency, based on the consensus algorithm, between the update queue managed at the first geographic location and the redundant copy of the update queue managed at the second geographic location.

15. The method as recited in claim 10, wherein combining the update with the existing update is based in part on the update and the existing update including a same designated priority.

16. The method as recited in claim 9, wherein sending information about the update to the second set of one or more computing devices at the second geographic location for adding the update to the redundant copy of the update queue comprises sending the information according to a consensus algorithm in which the first set of one or more computing devices acts as a leader that replicates updates to the update queue to the second set of one or more computing devices configured as a follower to maintain consistency, based on the consensus algorithm, between the update queue managed at the first geographic location and the redundant copy of the update queue managed at the second geographic location.

\* \* \* \* \*